United States Patent [19]

Brezovar et al.

[11] Patent Number: 5,269,713
[45] Date of Patent: Dec. 14, 1993

[54] METHOD OF FORMING AN ELECTRICAL CONNECTION, AND TERMINAL FORMED THEREBY

[75] Inventors: Joseph Brezovar, New Berlin; William J. Bergner, Plymouth; Michael Rudzik, Milwaukee, all of Wis.

[73] Assignee: Briggs & Stratton Corp., Wauwatosa, Wis.

[21] Appl. No.: 919,763

[22] Filed: Jul. 24, 1992

[51] Int. Cl.$^5$ .................................. H01R 4/02
[52] U.S. Cl. ........................ 439/881; 174/84 C; 174/94 R
[58] Field of Search ............ 439/881; 174/84 C, 94 R

[56] References Cited

U.S. PATENT DOCUMENTS

| | | | |
|---|---|---|---|
| 2,909,758 | 10/1959 | Modrey | 29/254 |
| 3,364,304 | 1/1968 | Modrey | 439/741 |
| 3,416,122 | 12/1968 | Kinkaid | 439/881 |
| 3,421,212 | 1/1969 | Chabot | 29/597 |
| 3,596,044 | 7/1971 | Katzin | 219/56.1 |
| 3,702,387 | 11/1972 | Klein | 174/94 R |
| 3,705,970 | 12/1972 | Weatherman et al. | 29/850 |
| 3,739,323 | 6/1973 | Spors | 439/875 |
| 4,143,936 | 3/1979 | DeRoss et al. | 439/881 |
| 4,531,500 | 7/1985 | Burson | 123/630 |
| 4,849,596 | 7/1989 | Riordan et al. | 219/56.22 |

FOREIGN PATENT DOCUMENTS 1151848 7/1963 Fed. Rep. of Germany .... 174/94 R
1574274 7/1969 France .

OTHER PUBLICATIONS

"Orbital Headforming" brochure by Taumel Assembly Systems of Patterson, New York, published in 1989.

Primary Examiner—Gary F. Paumen
Attorney, Agent, or Firm—Andrus, Sceales, Starke & Sawall

[57] ABSTRACT

A reliable mechanical and electrical connection is formed between a slotted rivet and an insulated ground wire using a minimum number of manual steps. The slotted rivet head has two spaced, opposed, semi-frustoconical sections that define a slot between them. The slotted rivet is placed and properly aligned in a coil frame, and the ground wires are placed into the slot. The rivet head is then deformed by an orbital riveter to capture a portion of the insulated wire within the rivet head. A resistive welder engages the rivet head to vaporize the insulation from the captured wire portion without touching the wire. The resulting terminal assembly has a unique design in which the deformed rivet head is substantially flat.

12 Claims, 18 Drawing Sheets

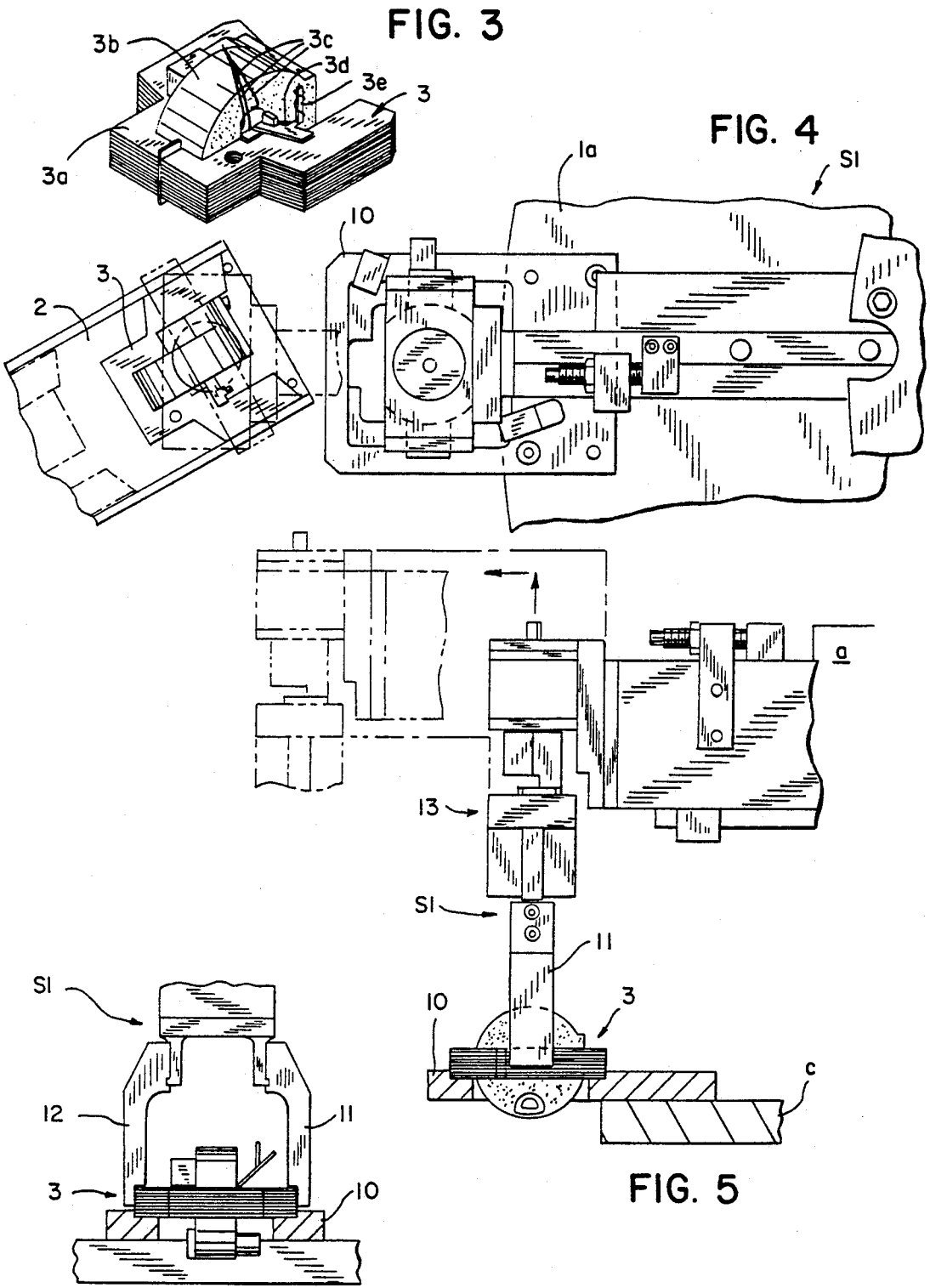

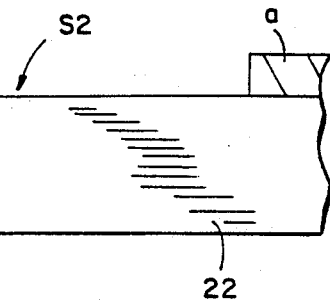
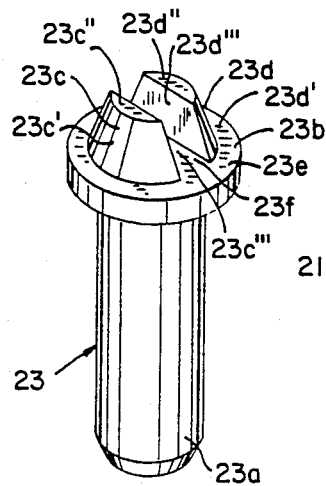
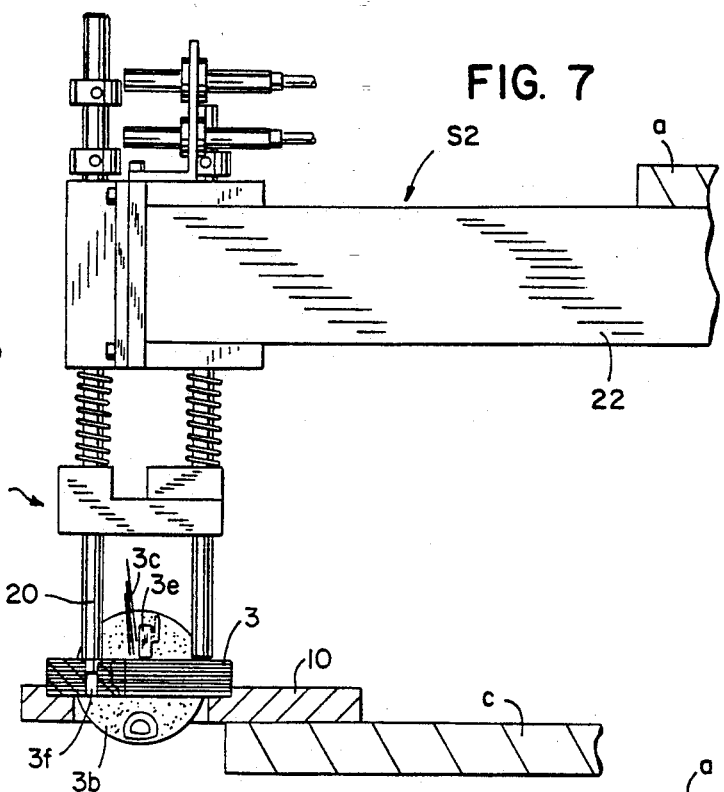
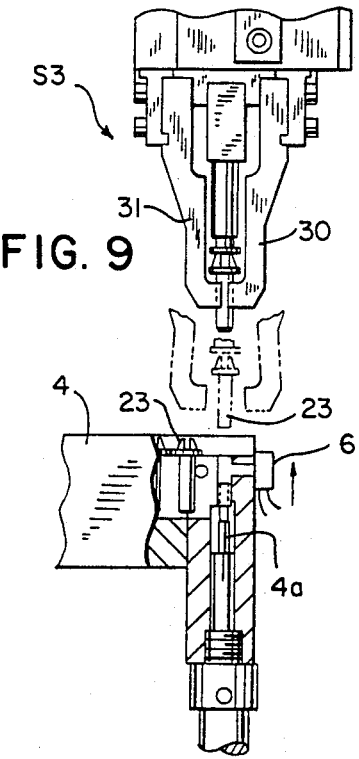
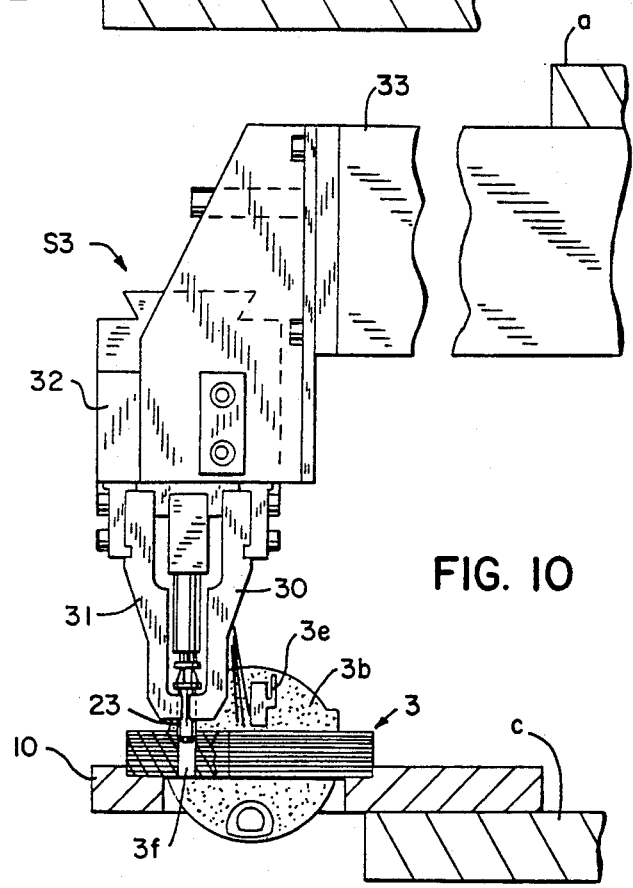

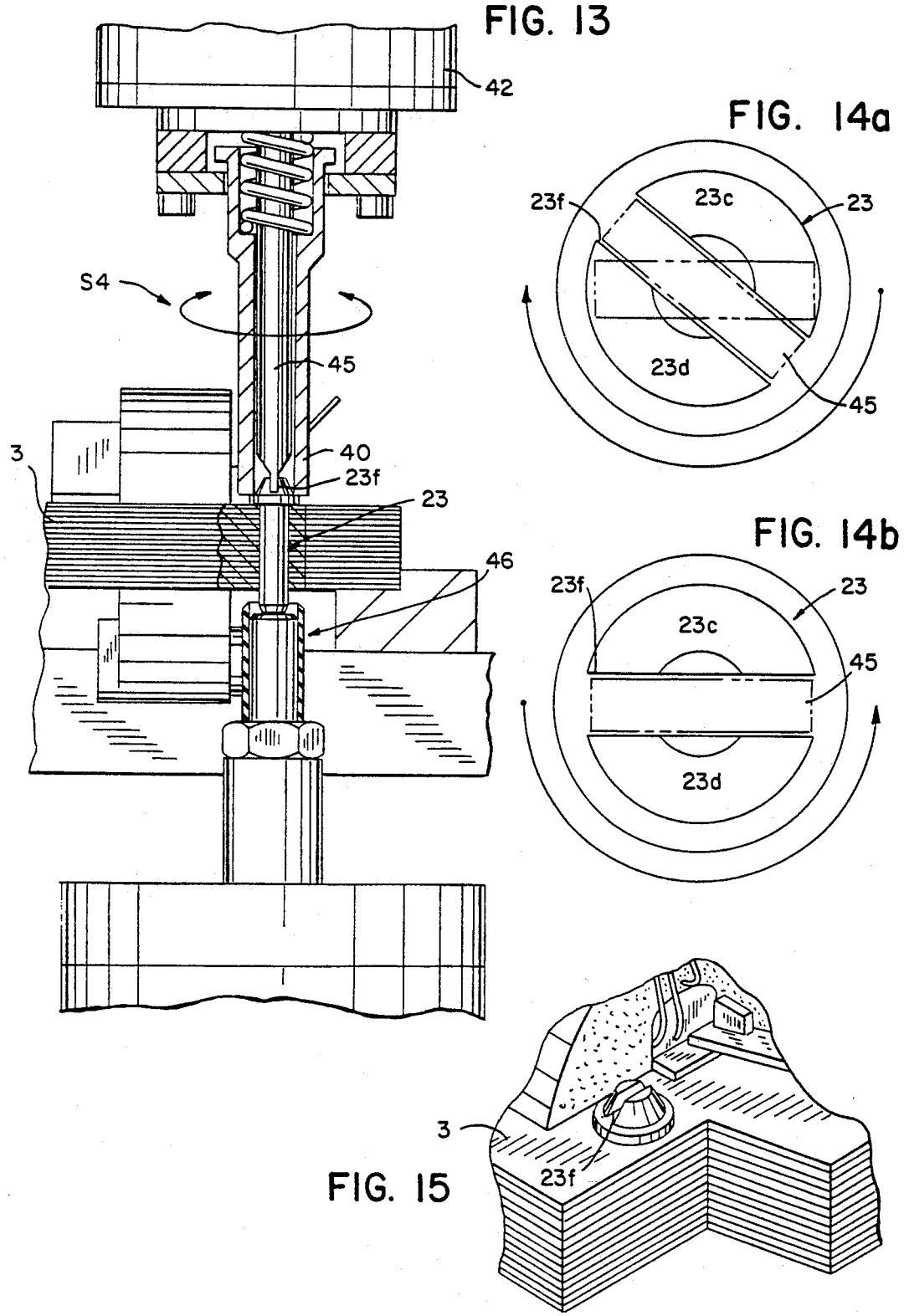

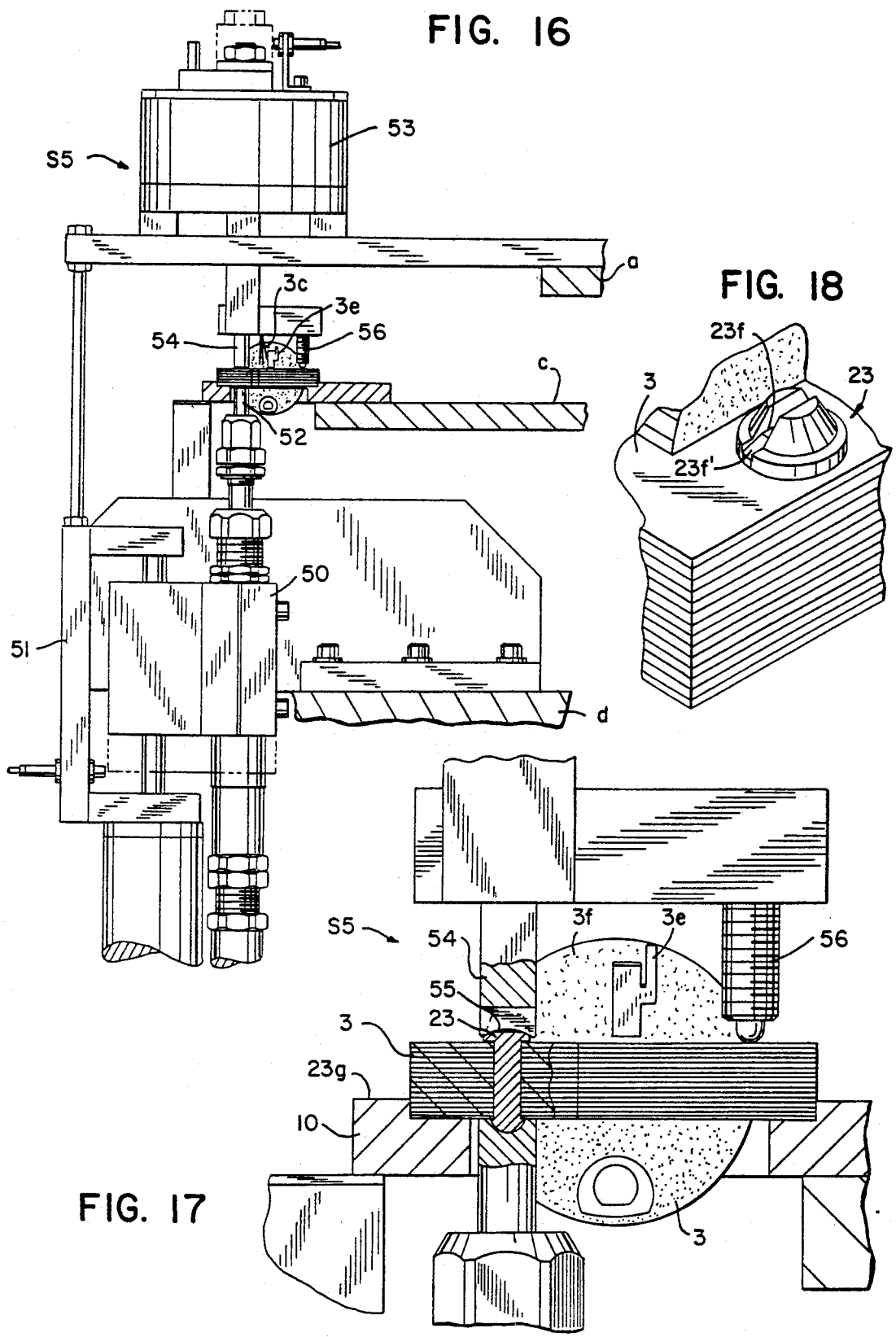

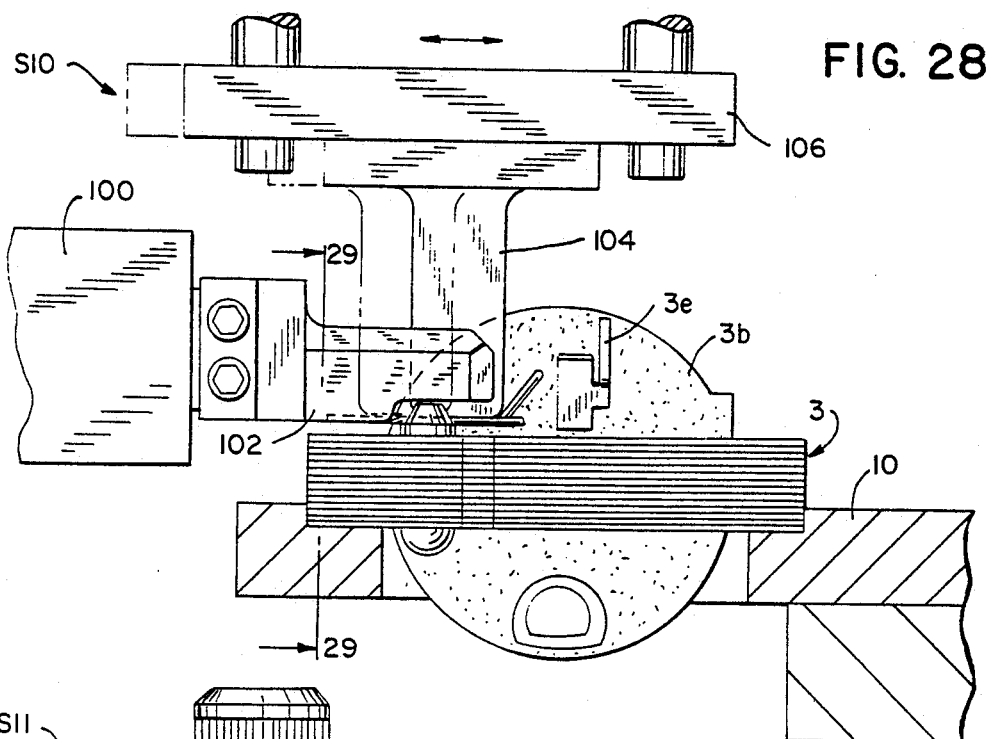
FIG. 28
FIG. 29
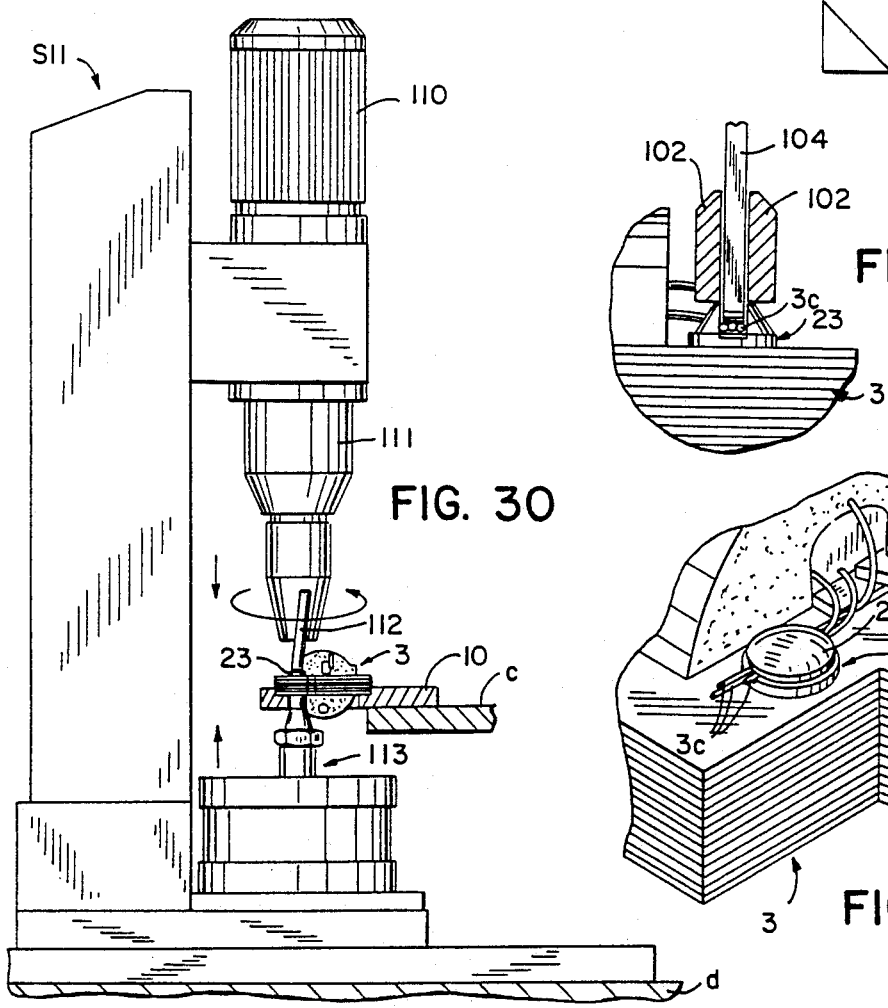
FIG. 30
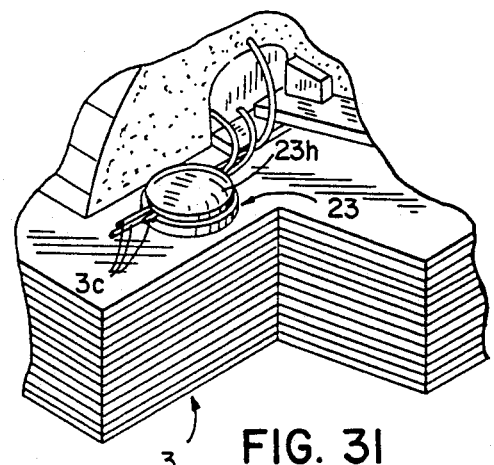
FIG. 31

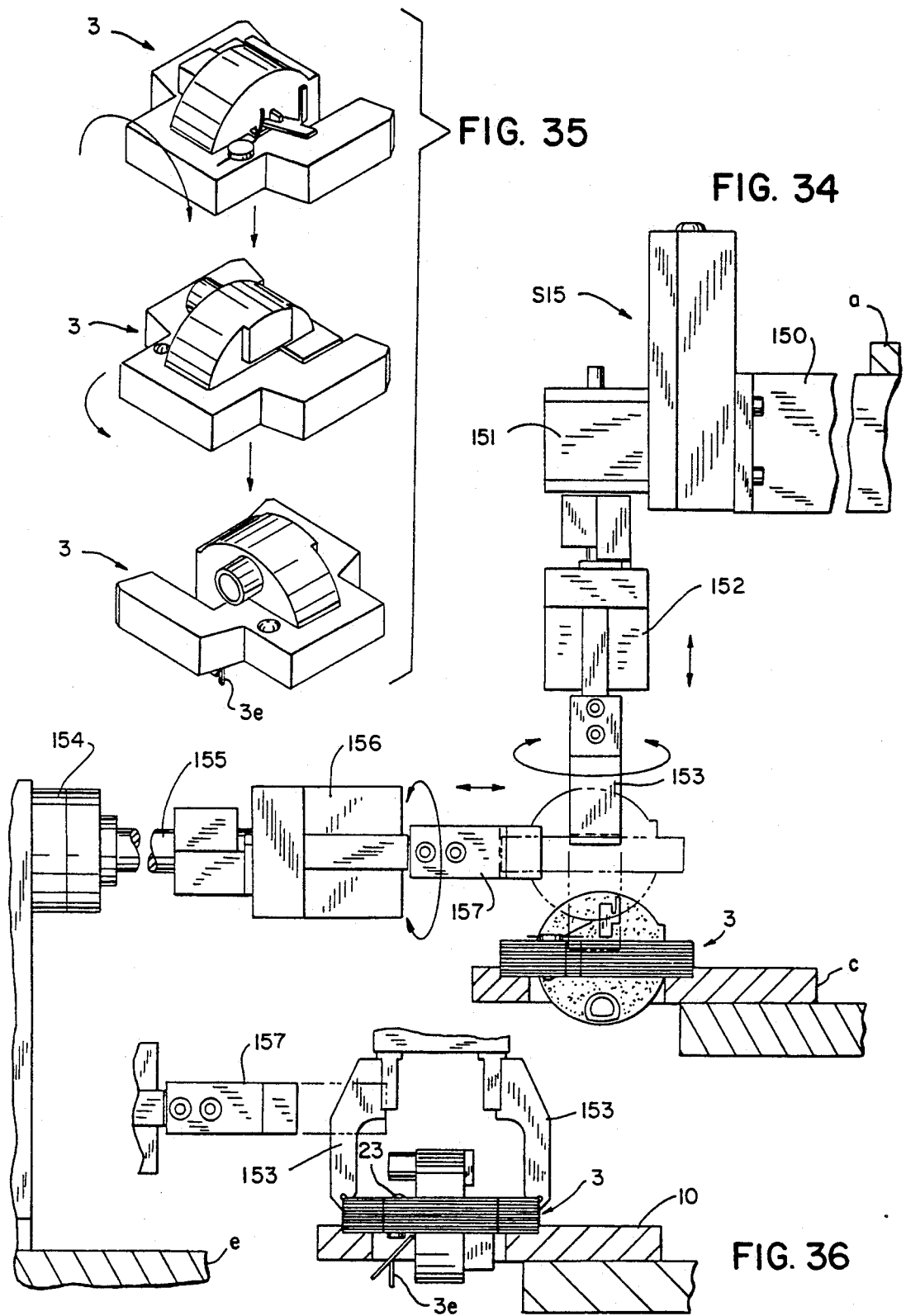

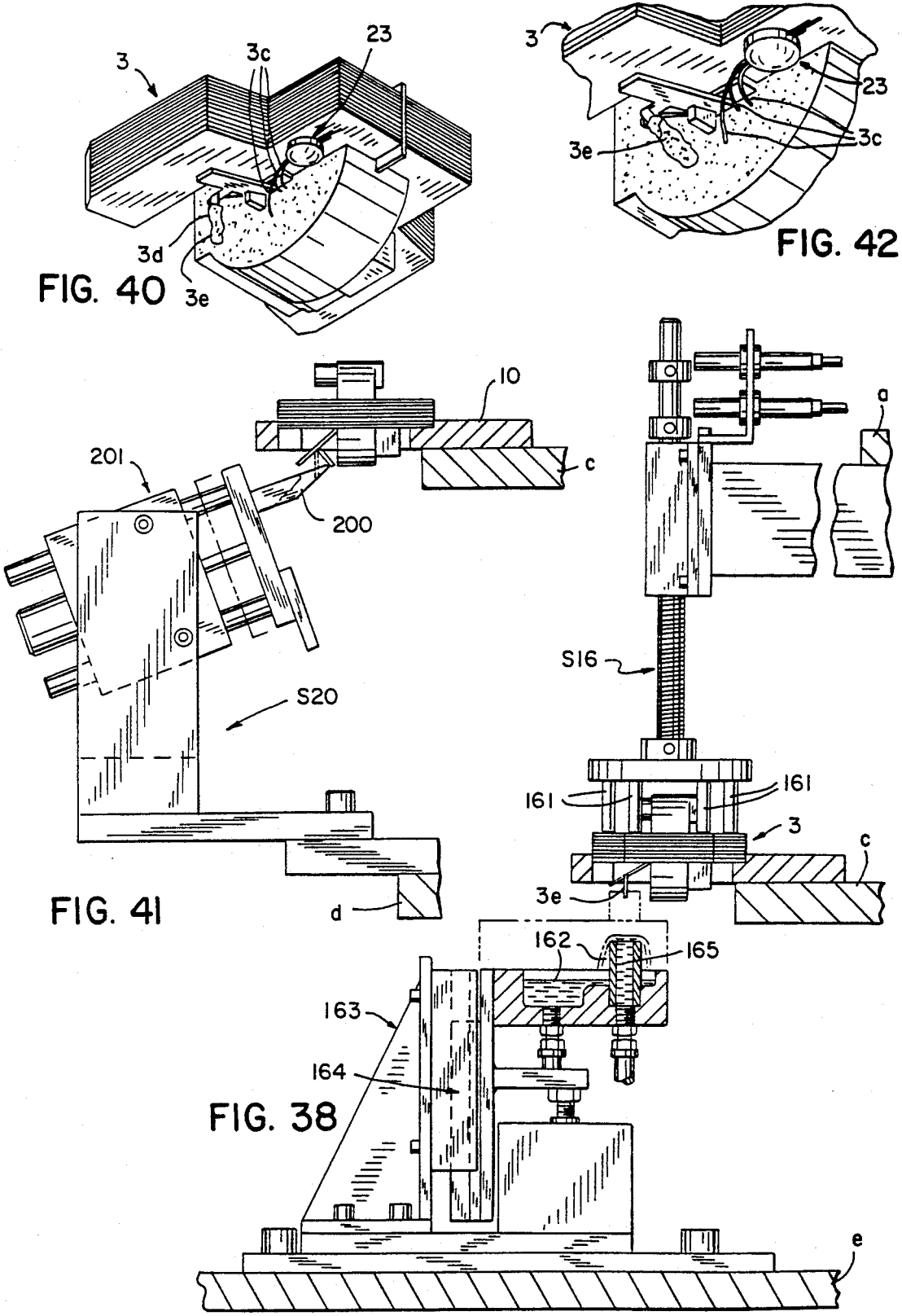

METHOD OF FORMING AN ELECTRICAL CONNECTION, AND TERMINAL FORMED THEREBY

BACKGROUND OF THE INVENTION

This invention relates to a method and apparatus for forming an electrical connection. More particularly, this invention relates to a method and apparatus for connecting engine coil wires to an engine frame component.

Many methods are known for connecting wires to terminals, and particularly to ground terminals. In a typical prior art method, a ring terminal is placed on the end of the ground wire and is positioned over an aperture in a frame structure. A metal screw is then used to connect the ring terminal to the frame. This process is time-consuming and very labor-intensive, thereby resulting in a very high cost. When many thousands of electrical connections must be made, the cost becomes exceedingly high.

Some prior art methods for connecting wires to ground terminals make the electrical connection between the wire and the terminal using a soldering or welding tool. In these prior art methods, the insulation must typically be removed from the wire to make a good electrical connection. The removal of the insulation is generally done manually, further increasing the number of steps in the method and thus the cost of the end product.

To avoid the need for removing the insulation, other methods apply the welding tool electrode directly to the insulated wire to vaporize the insulation. These methods are unsatisfactory, however, because the metal wire becomes so hot that it tends to harden and become brittle. The useful life of the electrical connection may be reduced.

Therefore, it is desirable to provide a method for making a reliable mechanical and electrical connection between a wire and its terminal using a minimum number of manual steps.

SUMMARY OF THE INVENTION

A low cost method is disclosed for making reliable mechanical and electrical connections between a wire and a terminal. Although the method may be used to make a variety of electrical connections, it is particularly suitable for making connections between a coil ground wire and a frame component of an internal combustion engine.

In a preferred embodiment, the method includes the steps of:

1) placing an attachment member such as a slotted rivet in an aperture in the frame structure, the attachment member having a slot in its head;

2) straightening the insulated ground wires and then pre-bending them to a particular position;

3) positioning the insulated wires in the slotting head of the attachment member;

4) pressing the wires in the slot by repeatedly rubbing them;

5) deforming the slotted head of the attachment member by applying a spinning peen of a spin or orbital riveter under pressure, thereby capturing a portion of the insulated wires in the slot;

6) applying a heating tool such as a resistive welder to the deformed attachment member head without the heating tool touching the captured wire portions, thereby vaporizing at least some of the insulation from the captured wire portions;

7) inducing a magnetic field in the frame structure and measuring the output of the circuit to test the quality of the circuit as well as of the connections between the captured wire portions and the attachment member.

The preferred method also includes other steps described below which expedite the forming of the electrical connections.

The invention also includes a unique slotted rivet design and a unique electrical terminal assembly formed using the slotted rivet and the method described herein.

The unique slotted rivet terminal connector includes an elongated, substantially cylindrical shank portion having an upper end and a substantially cylindrical head formed integral with the upper end of the shank portion. The head is preferably normal to the longitudinal axis of the shank portion. The head includes a base portion having a width greater than the width of the shank portion, and a pair of spaced, opposed, semi-frustoconical sections protruding from the base portion in a direction away from the shank portion. The spaced semi-frustoconical sections define the slot discussed above.

When the unique electrical terminal connector is used in the method according to the present invention, a unique solderless, electrical terminal assembly is achieved that is superior to prior art terminal assemblies.

The terminal assembly according to the present invention includes the terminal connector described above except that the head now has a substantially flat upper surface since the semi-frustoconical sections have been deformed by a riveting tool to yield a substantially flat surface. The terminal assembly also includes at least one wire having an uninsulated wire section disposed within the base portion and beneath the upper surface of the base. On both sides of the base portion are insulated wire sections, so that the wire includes a first insulated section, an uninsulated section disposed within the base portion, and then another insulated section disposed on the opposite side of the base portion from the first insulated section.

It is a feature and advantage of the present invention to provide an inexpensive, automated process for connecting wires to a ground terminal.

It is another feature and advantage of the present invention to provide a reliable method for making mechanical and electrical connections between a wire and a ground terminal.

It is another feature and advantage of the present invention to minimize the number of manual steps required in forming a connection between a ground wire and a ground terminal.

These and other features and advantages of the present invention will be apparent to those skilled in the art from the following description of the preferred embodiments and the attached drawings, in which:

BRIEF DESCRIPTION OF THE DRAWINGS

FIG. 3 is a perspective view of a coil frame for an internal combustion engine before the present method is applied to it.

FIG. 4 is a top view of station s1 of the indexing machine depicting the coil frame being fed and transferred to the fixture nest on the indexing machine.

FIG. 5 is a side view of station s1 depicting a frame being gripped, taken along line 5—5 of FIG. 1.

FIG. 6 is an exploded view of the gripping jaws of FIG. 5, shown from an angle 90° counterclockwise from FIG. 5.

FIG. 7 is a side view of station s2, taken along line 7—7 of FIG. 1.

FIG. 8 is a perspective view of the slotted rivet according to the present invention.

FIG. 9 is an exploded side view of station s3.

FIG. 10 is a side view of station s3, taken along line 10—10 of FIG. 1.

FIG. 13 is a side view of station s4 depicting the orienting of the rivet head.

FIG. 14a and 14b depict the manner in which the rivet head is properly oriented. FIG. 14a depicts the orientation by first rotating the screwdriver head up to 180° in the clockwise direction until it finds the rivet slot. FIG. 14b depicts the rivet head being then rotated up to 180° in the counterclockwise direction.

FIG. 15 is an exploded view of a coil frame depicting a properly oriented rivet.

FIG. 16 is a side view of station s5, taken along line 16—16 of FIG. 1.

FIG. 17 is an exploded side view of FIG. 16 depicting the impact hammering step.

FIG. 18 is an exploded view of a coil frame depicting a rivet having a slot with a curved bottom surface.

FIG. 28 is an exploded side view of station s10, depicting the wire being pressed into the rivet slot.

FIG. 29 is an exploded view of station s10 depicting the wires being pressed into the rivet slot, shown from an angle 90° clockwise from the view of FIG. 28.

FIG. 30 is a side view of station s11 depicting the orbital riveting step.

FIG. 31 is an exploded view of the frame depicting the rivet-ground wire terminal assembly after the orbital riveting step.

FIG. 34 is a side view of station s15 wherein the coil frame is rotated to orient the ignition ground wire above the flux bath, taken along line 34—34 of FIG. 1.

FIG. 35 depicts the sequence through which the frame is rotated at station s15.

FIG. 36 is an exploded side view of station s15 depicting the position of the frame after the rotation sequence of FIG. 35.

FIG. 38 is a side view of station s16 depicting the flux bath being raised up to the ignition ground wire, taken along line 38—38 of FIG. 37.

FIG. 40 is a perspective view of the coil frame after the ground wire has been soldered.

FIG. 41 is a side view of station s20 depicting the soldered ear being bent 45°, taken along line 41—41 of FIG. 1.

FIG. 42 is an exploded view of a frame depicting the ignition ground wire after it was bent at station s20.

DETAILED DESCRIPTION OF THE PREFERRED EMBODIMENTS

The method according to the present invention may be used to connect one or more wires to any type of terminal. However, the preferred embodiment of the present invention described herein connects three ground wires of an engine coil frame to an attachment member or rivet in the coil frame structure. These three wires include an insulated wire from the primary winding, one wire from the secondary winding of the engine ignition system, and one wire from the collector of the Darlington transistor used in the ignition circuit. The ignition circuit is described in U.S. Pat. No. 4,531,500 issued Jul. 30, 1985 to Burson, which is incorporated by reference herein.

The preferred embodiment according to the present invention also includes the soldering of a ground wire from the opposite side of the ignition primary winding and from the emitter of the Darlington transistor to a different ground terminal.

Figure 1:
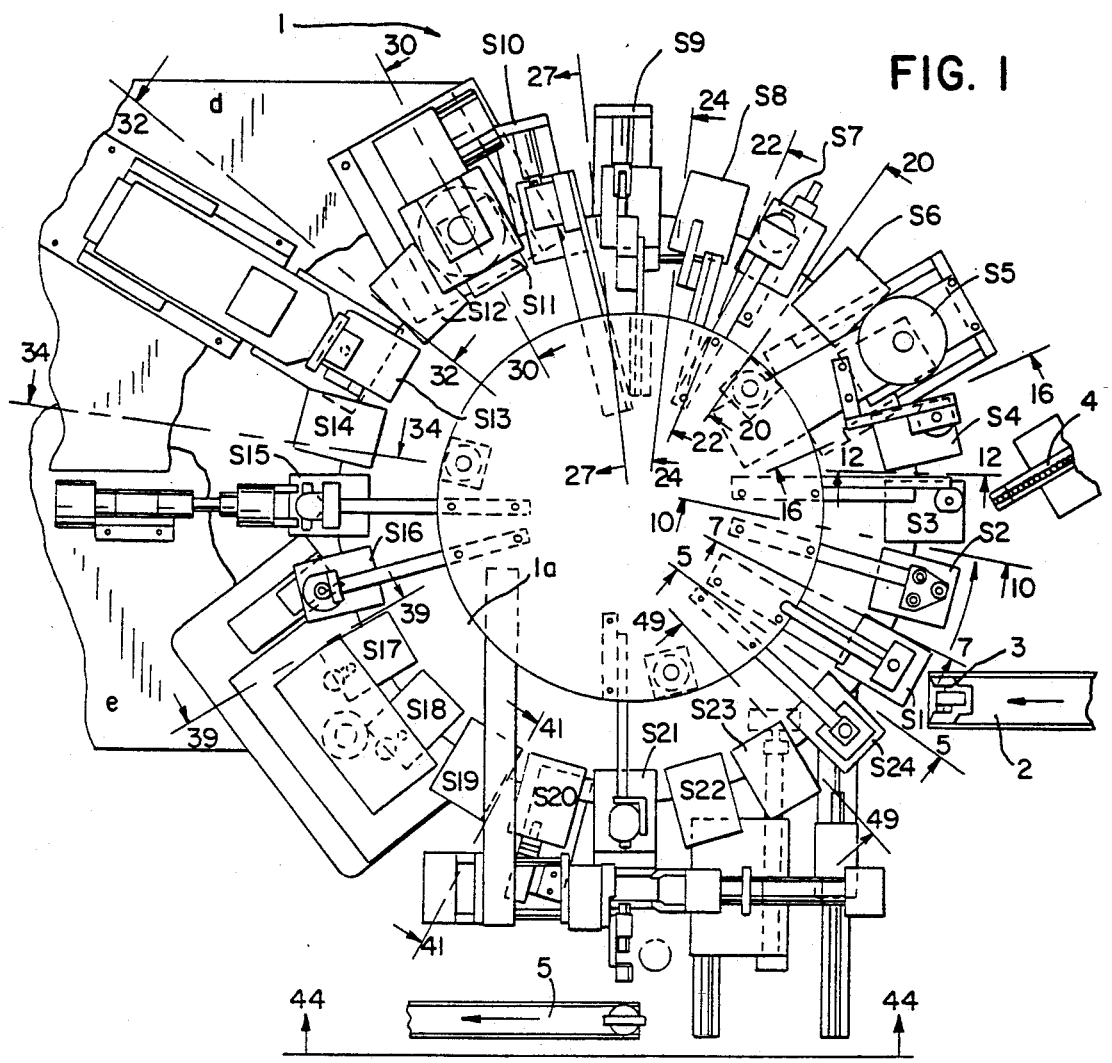
FIG. 1 is a plan view of the indexing machine used in the method according to the present invention depicting all of the stations of the indexing machine.

The method according to the present invention is preferably achieved using a specially-adapted dial indexing machine that is driven by a Camco type of drive. FIG. 1 is a plan view of the dial indexing machine. As shown in FIG. 1, indexing machine 1 includes 24 stations numbered s1 through s24 in a counterclockwise direction. All of the stations are described herein except stations s6, s12, s14, s19, s22, and s23 which are not used in the method and are empty.

Indexing machine 1 has a dial 1a that is rotated in an index fashion in the counterclockwise direction. Dial 1a includes a plurality of fixtures on its outer periphery, each of the fixtures being adapted to retain a coil frame therein. Except for the empty stations, at least one operation is performed when the coil frame is indexed to each station.

FIG. 1 also depicts a feed conveyor 2 whereby a coil frame 3 to be processed is fed to station s1. FIG. 1 also depicts a conveyor 4 whereby rivets are fed to station s3 for processing. A conveyor 5 carries away the finished coil frames after they have been tested at station s21.

Figure 2:
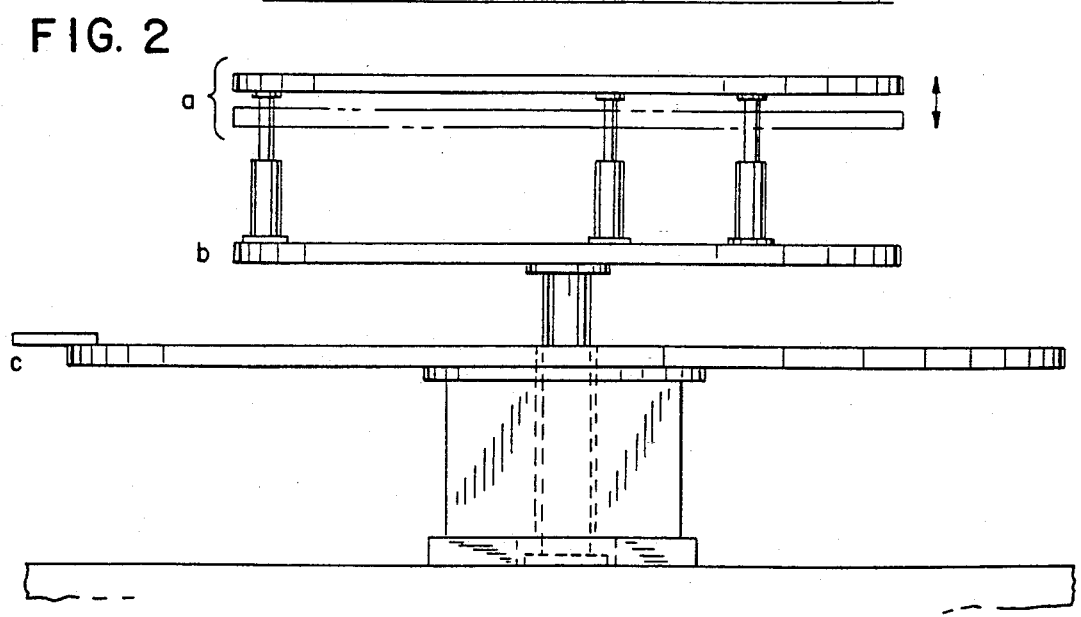
FIG. 2 is a diagrammatical side view of the indexing machine depicting the different machine platforms a-c on which many of the stations are disposed.

FIG. 2 is a diagrammatical side view depicting the different platforms to which portions of stations s1 through s24 are attached. The platforms are identified by the letters a, b, and c (FIG. 2), and by the letters d and e (FIG. 1). Throughout the drawings, these letters will be used to indicate to which platform a particular station component is attached. As shown in FIG. 2, platform a is movable in an upward and downward direction via cams under the index table.

FIG. 3 depicts coil frame 3 before it is processed using the method of the present invention. Coil frame 3 includes a plurality of laminations 3a, and an ignition module 3b that includes the ignition circuit, the ignition primary and secondary windings, and the trigger winding.

Extending from ignition module 3b is a plurality of ground wires 3c which will be attached to the laminations 3a of frame 3 by the method described herein. At least one of ground wires 3c is insulated. Also extending from ignition module 3b is a primary coil wire 3d that will be attached to a separate shut off terminal 3e by the soldering process described herein. The present invention as described herein is used with an "open 30 to run" type of ignition system in which terminal 3e is connected to the coil frame ground to kill the ignition. Of course, the present invention may be used with other types of ignition systems.

FIG. 4 is a top view of station s1 depicting coil frame 3 being fed and transferred to fixture 10 at station s1. Fixture 10 is connected to the outer periphery of indexing dial 1a.

As best shown by the side views of FIG. 5 and 6, frame 3 is transferred to fixture 10 by a pair of opposed grab jaws 11 and 12 which grab the sides of frame 3, lift it from conveyor 2, and place frame 3 in fixture 10. Grab jaws 11 and 12 are connected to a grab arm 13 which moves in the vertical and horizontal directions in response to the control of a processor (not shown). The processor controls all of the movements of indexing machine 1 as well as the operations of the stations. One suitable processor is manufactured by Entron.

Dial 1a is then indexed to station s2, which is depicted in FIG. 7. The purpose of station s2 is to inspect to make sure that frame 3 is present and in the proper position in fixture 10. This inspection is accomplished in station s2 by a proximity sensor 20 connected to a movable arm 21. Sensor 20 determines whether frame 3 is in a proper position by detecting the presence of rivet hole 3f in frame 3. Sensor 20 moves in a downward direction until it has engaged rivet hole 3f. The movement of sensor 20 is controlled by the processor and suitable pneumatics. Arm 22 of station s2 is connected to a platform a, whereas fixture 10 is connected to platform c.

FIG. 8 is a perspective view of a slotted attachment member or rivet 23. Rivet 23 has a substantially cylindrical shank portion 23a, a substantially cylindrical base portion 23b formed integral at one end of shank portion 23a, and two members 23c and 23d which protrude from the upper surface 23e of base portion 23b. Base portion 23b, members 23c and 23d and rivet slot 23f comprise the rivet head.

As shown in FIG. 8, members 23c and 23d are each shaped like semi or one-half frustoconical sections. That is, their outer surfaces 23c' and 23d' respectively are substantially conical in shape. The upper surfaces 23c'' and 23d'' of members 23c and 23d respectively are substantially flat as they are in a truncated cone or frustum. The inner surfaces 23c''' and 23d''' are substantially flat and face each other. Sections 23c and 23d are spaced apart to form a slot 23f therebetween.

Although the preferred embodiment described herein uses a separate rivet component to form the terminal assembly, it should be apparent to those skilled in the art that the rivet or other attachment member could be formed integral with coil frame 3 without departing from the spirit of the present invention.

FIGS. 9 and 10 are side views of station s3 in which rivet 23 is held in place by use of a vacuum system 6, and is then picked off of conveyor 4 and placed in rivet hole 3f of coil frame 3.

As best shown in FIG. 9, rivet 23 is pushed slightly upward off of conveyor 4 by a reciprocating member 4a. This facilitates the gripping and removal of the rivet from conveyor 4. At the same time, grab jaws 30 and 31 grab rivet 23 and lift it off of conveyor 4.

Referring to FIG. 10, grab jaws 30 and 31 then deposit rivet 23 in rivet hole 3f of coil frame 3. Grab jaws 30 and 31 are attached to a movable arm 32 which in turn is connected to an arm 33.

Figure 11:
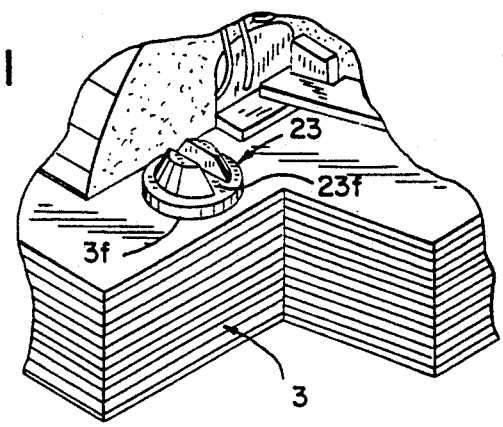
FIG. 11 is an exploded view of a coil frame with the rivet disposed in a frame aperture.

FIG. 11 is an exploded perspective view of frame 3 depicting rivet 23 after it has been placed in aperture 3f.

Figure 12:
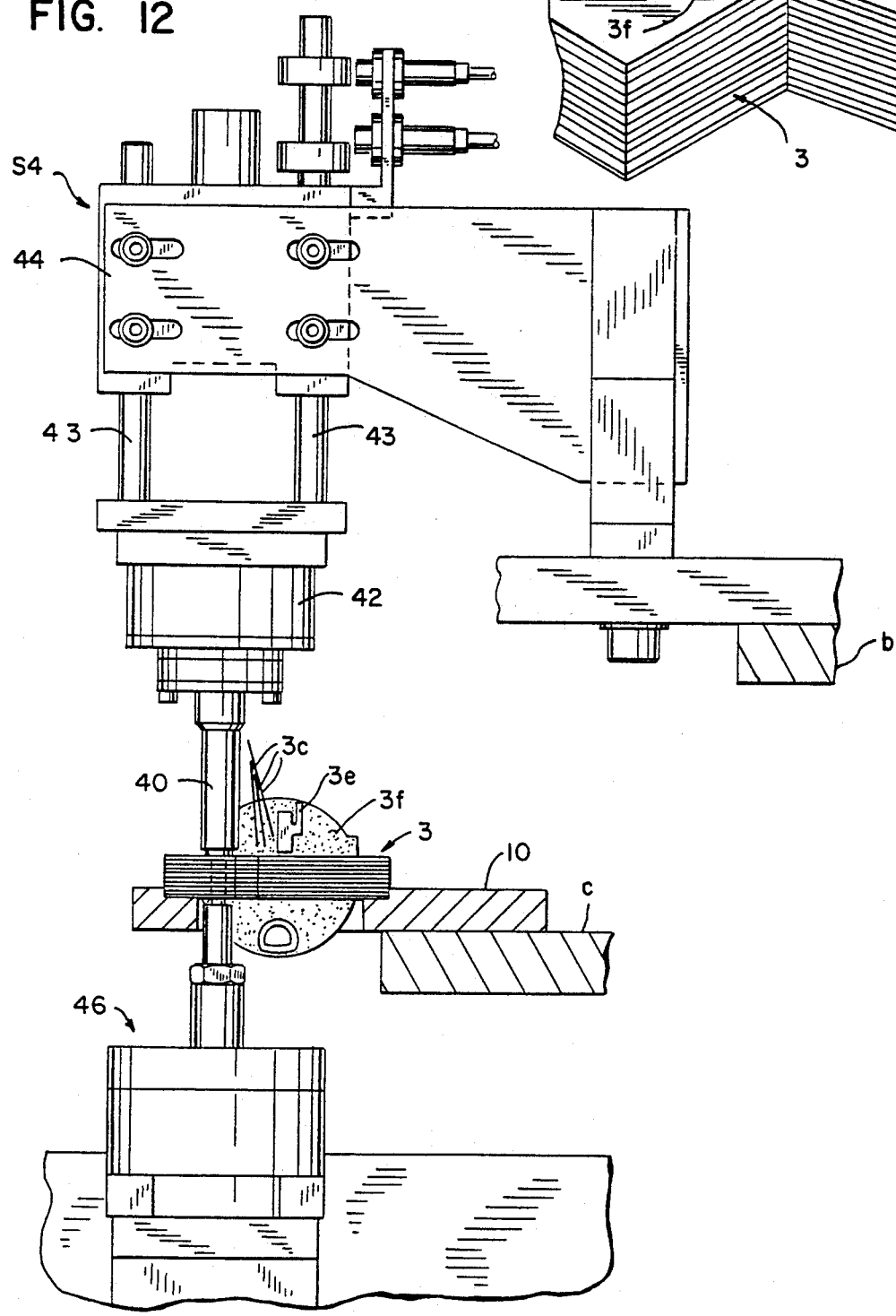
FIG. 12 is a side view of station s4, taken along line 12—12 of FIG. 1.

FIGS. 12 and 13 are side views of station s4. FIG. 12 depicts the inspection for the presence of rivet 23 in frame 3. This is accomplished by a proximity sensor 40 which engages the head of rivet 23, and more particularly either rivet base 23b and/or protruding members 23c and 23d. If proximity sensor 40 successfully engages the rivet, sensor 40 informs the central processor that the rivet is present.

Proximity sensor 40 is spring-loaded via a spring 41 (FIG. 13), and is attached to an arm 42. Arm 42 is movable via pneumatic cylinders 43 which are interconnected with an arm 44. Arm 44 is interconnected with platform b as shown in FIG. 12.

FIG. 13 depicts another step carried out at station s4. In this step, a rotatable screwdriver head 45 disposed within proximity sensor 40 locates, engages, and then rotates slot 23f of rivet 23. Rivet 23 is supported at its bottom end by an anvil assembly 46.

Screwdriver head 45 is rotated up to 180° in the clockwise direction (FIG. 14a) until it locates the rivet slot. Screwdriver head 45 then rotates rivet 23 up to 180° in the counterclockwise direction (FIG. 14b) until head 45 reaches a positive stop. Screwdriver 45 reaches a positive stop when slot 23f is in the position depicted in FIG. 14b. The purpose of this operation is to orient rivet slot 23f in a known position. FIG. 15 is an exploded view of coil frame 3 depicting rivet slot 23f after it has been properly oriented by screwdriver head 45.

FIG. 16 and 17 are side views of station s5. Two operations are performed at station s5: an impact hammer attaches the bottom end of the rivet to the coil frame, and the bottom of rivet slot 23f is curved so that the ground wires will lie in the slot in a more desirable position.

In FIGS. 16 and 17, an impact hammer 50, movable in the vertical direction by suitable pneumatics, is connected to an arm 51 that is in turn attached to platform d. Hammer 50 has a hammer head 51 whose purpose is to flatten out bottom end 23g of rivet 23. The flattening of end 23g insures that rivet 23 will remain affixed to coil frame 3.

At the same, an impact hammer 53 and its head 54 shape the bottom surface of rivet slot 23f. Hammer 54 has a curved end 55 (FIG. 17) that is used to shape slot 23f. The precise position of frame 3 is detected by a proximity sensor 56. Hammer 53 is attached to platform a.

FIG. 18 is an exploded view of coil frame 3 in which bottom surface 23f' of slot 23f is curved after being shaped by hammer surface 55.

Figure 19:
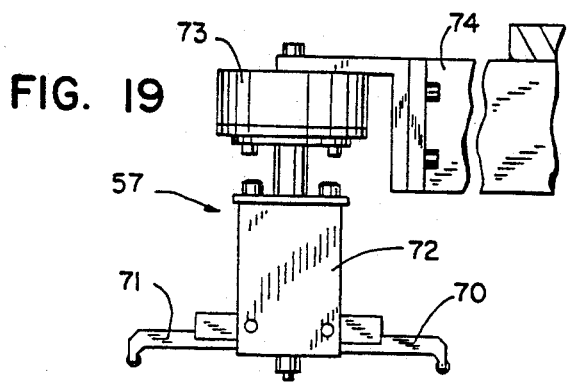
FIG. 19 is 1 side view of a portion of station s7, depicting the grab jaws in the open position.
Figure 20:
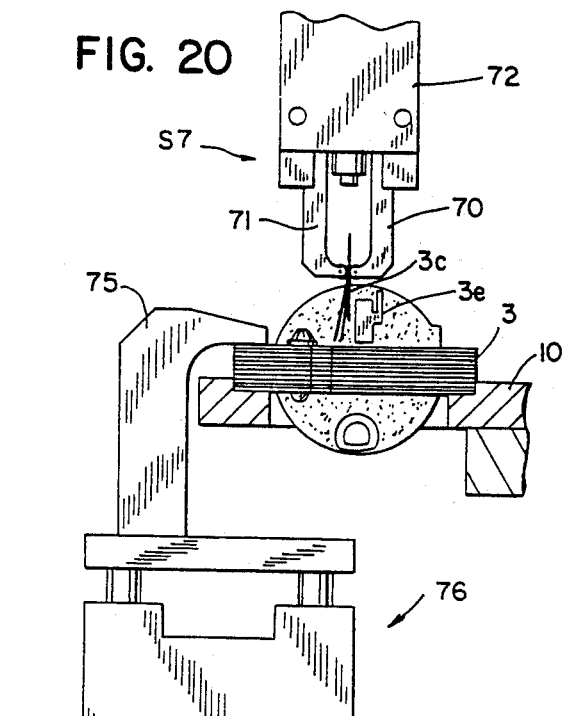
FIG. 20 is a side view of station s7 depicting the gathering of the ground wires, taken along line 20—20 of FIG. 1.
Figure 21:
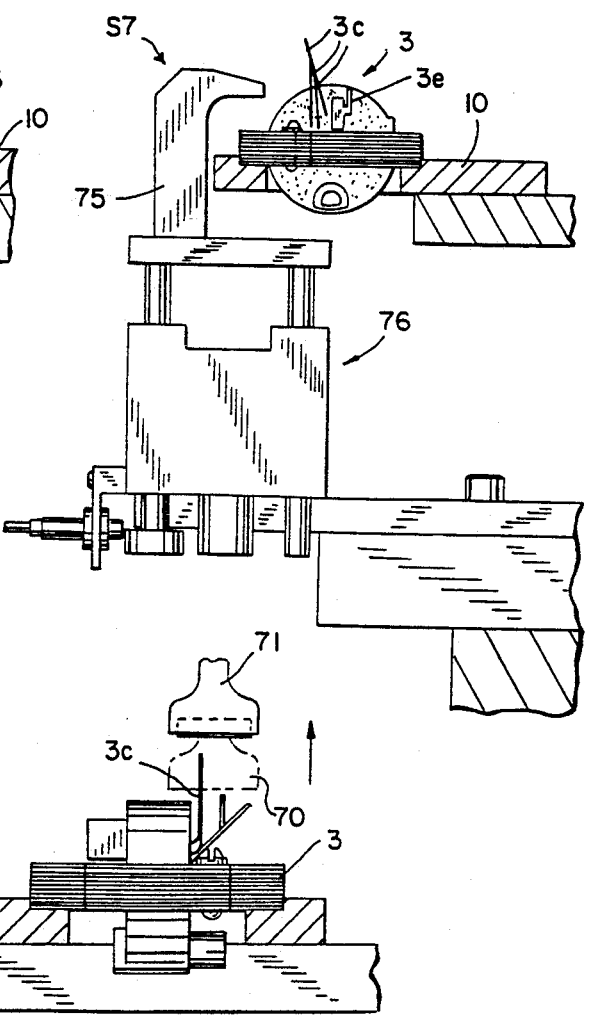
FIG. 21 is a side view of station s7 depicting the grab jaws grabbing the wires again after the grab jaws have been rotated 90° in the clockwise direction.

FIGS. 19 through 21 all relate to station s7. At this station, ground wires 3c are collected and placed in a substantially vertical position to facilitate their subsequent placement in slot 23f.

The first step of this process is shown in FIG. 19. Grab jaws 70 and 71 are placed in the spread or open position. Jaws 70 and 71 are attached to a rotatable arm 72 which is rotated by a rotary cylinder 73. Rotary cylinder 73 is mounted to an arm 74.

As best shown in FIG. 20, jaws 70 and 71 are then positioned over ground wires 3c and the jaws are closed to grasp the ground wires. Arm 72 is then moved in an upward vertical direction to straighten the wires and place them in a vertical position. Arm 75 retains frame 3 in fixture 10. Arm 75 is moved into position by suitable pneumatics 76.

FIG. 21 depicts grab jaws 70 and 71 being opened and removed after the jaws have been rotated 90° and have straightened wires 3c again. Wires 3c are left in a substantially vertical position.

Figure 22:
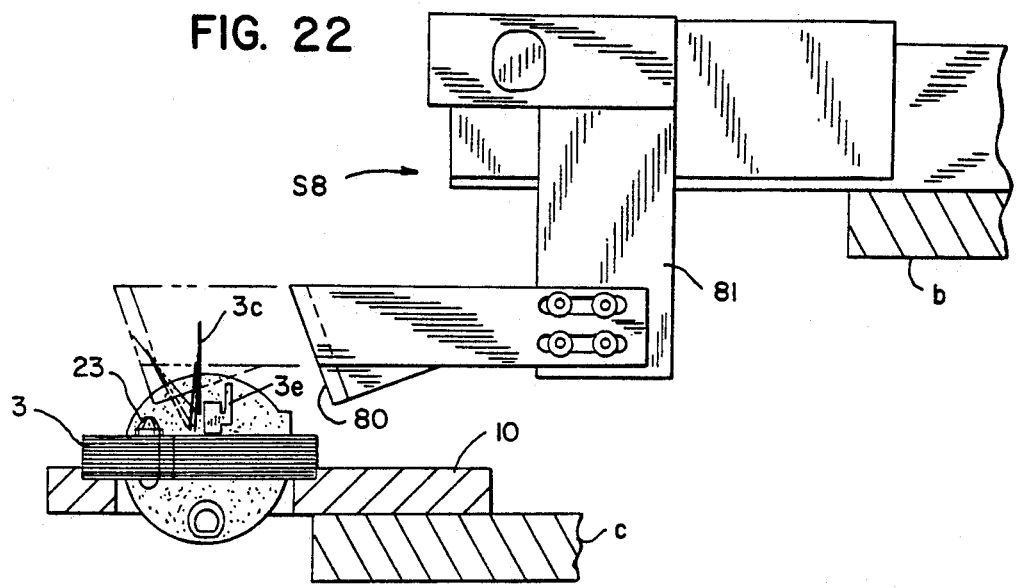
FIG. 22 is a side view of station s8 depicting the wires in the process of being slightly prebent, taken along line 22—22 of FIG. 1.
Figure 23:
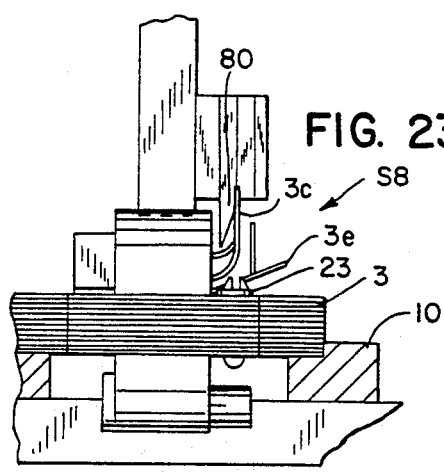
FIG. 23 is an exploded view of station s8 depicting the coil frame from a position that is 90° clockwise of FIG. 22.

Station s8, as depicted in FIGS. 22 and 23, pre-bends ground wires 3c to a desired angular position to facilitate their placement in slot 23f. As best shown in FIG. 22, wires 3c are moved from the vertical position to an angular position by an angled arm 80 extending from arm 81. Arm 80 is moved into engagement with wires 3c by suitable pneumatics (not shown). The precise shape of arm 80 is best shown in FIG. 23.

Figure 24:
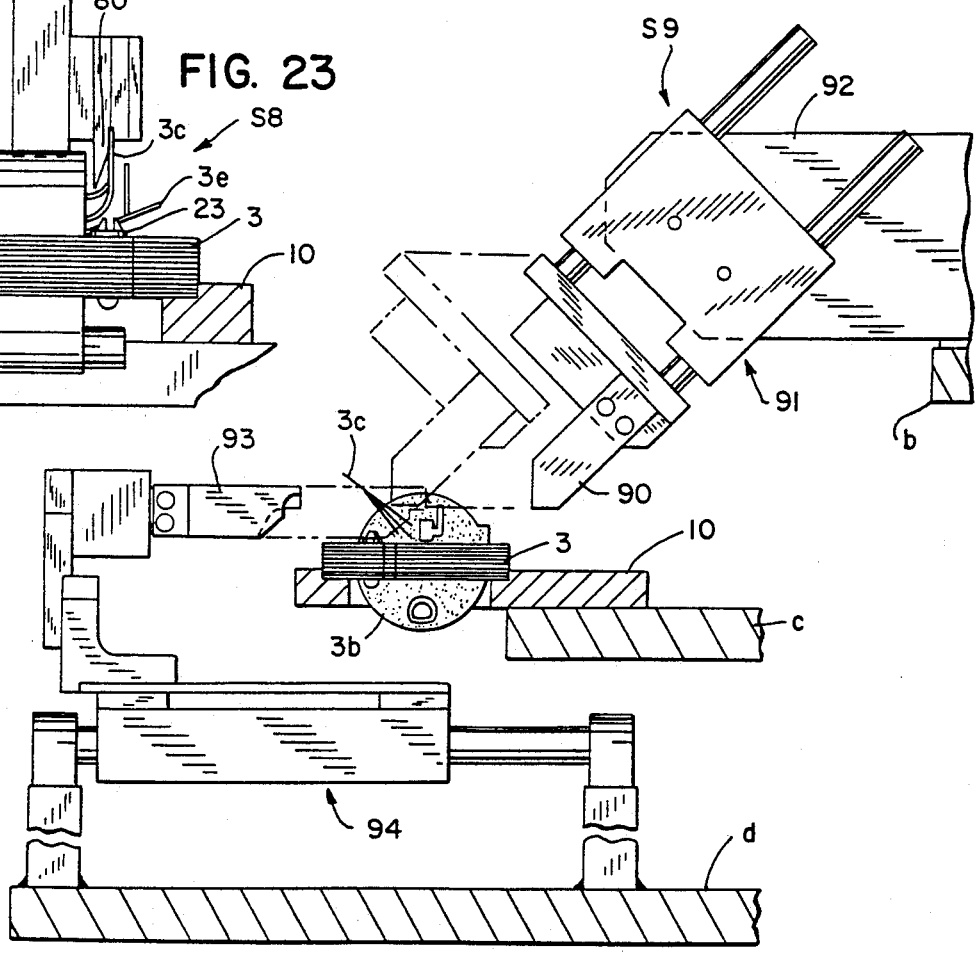
FIG. 24 is a side view of station s9 depicting the wires being aligned over the rivet slot, taken along line 24—24 of FIG. 1.
Figure 25:
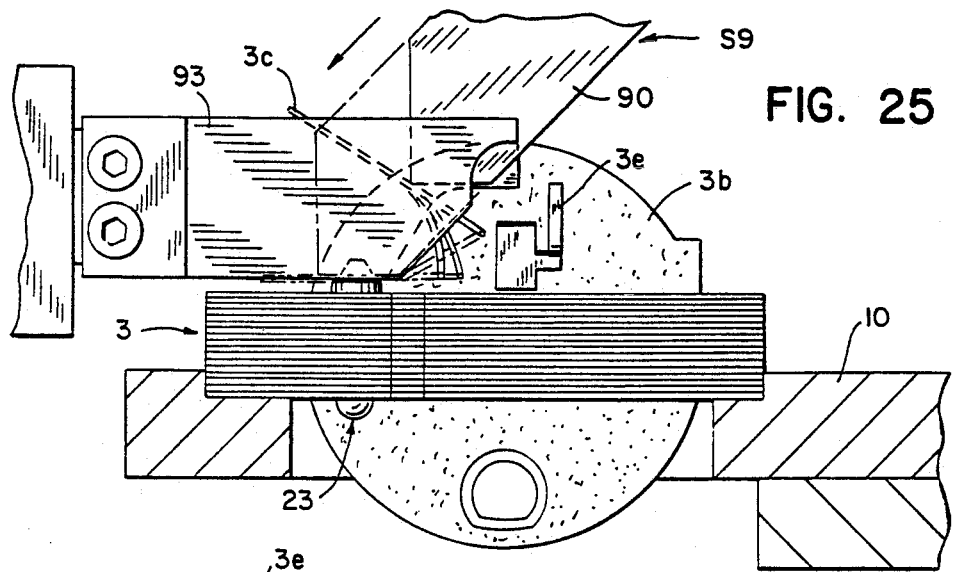
FIG. 25 is an exploded view of station s9 depicting the wires being aligned over the rivet slot.

FIGS. 24 and 25 depict station s9, which is used to align wires 3c over slot 23f. Referring to FIG. 24, aligning arm 90 is moved into engagement with wires 3c via suitable pneumatics 91, which in turn are interconnected with an arm 92 attached to platform b. At the same time, a retaining arm 93 is moved into engagement with ignition module 3b to retain frame 3 in a secure position in fixture 10. Arm 93 is moved into position by suitable pneumatics 94, which in turn are connected to platform d.

Figure 26:
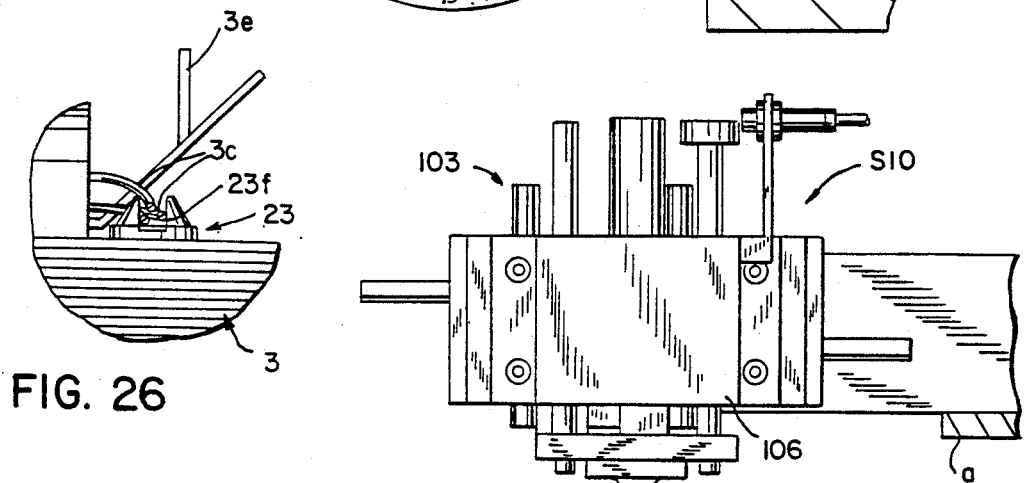
FIG. 26 is an exploded side view of the coil frame depicting the wires aligned over the rivet slot.

FIG. 25 is an exploded view which more clearly depicts the movement of arm 90 and its engagement with ground wires 3c to place the wires within rivet slot 23f. FIG. 26 depicts wires 3c after they have been aligned in rivet slot 23f at station s9.

Figure 27:
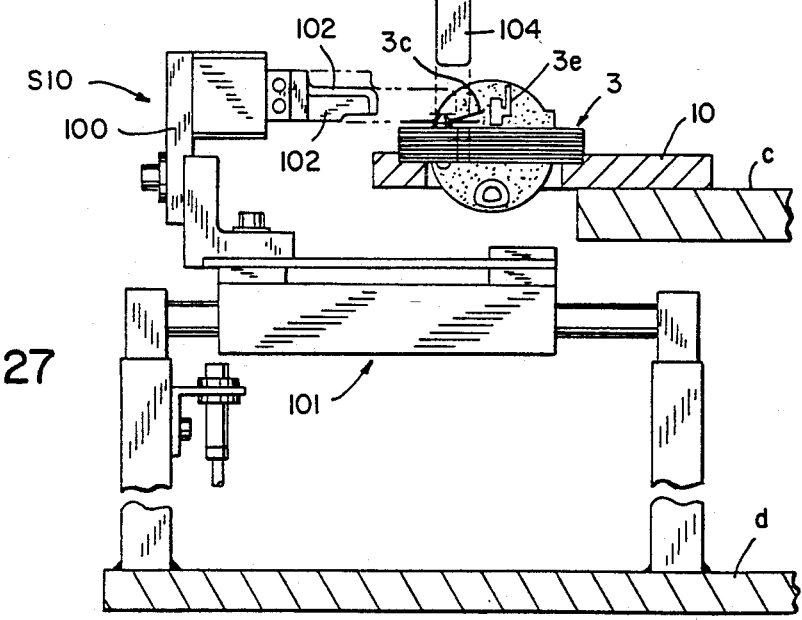
FIG. 27 is a side view of station s10 shown just before the wires are pressed into the rivet slot, taken along line 27—27 of FIG. 1.
Figure 32:
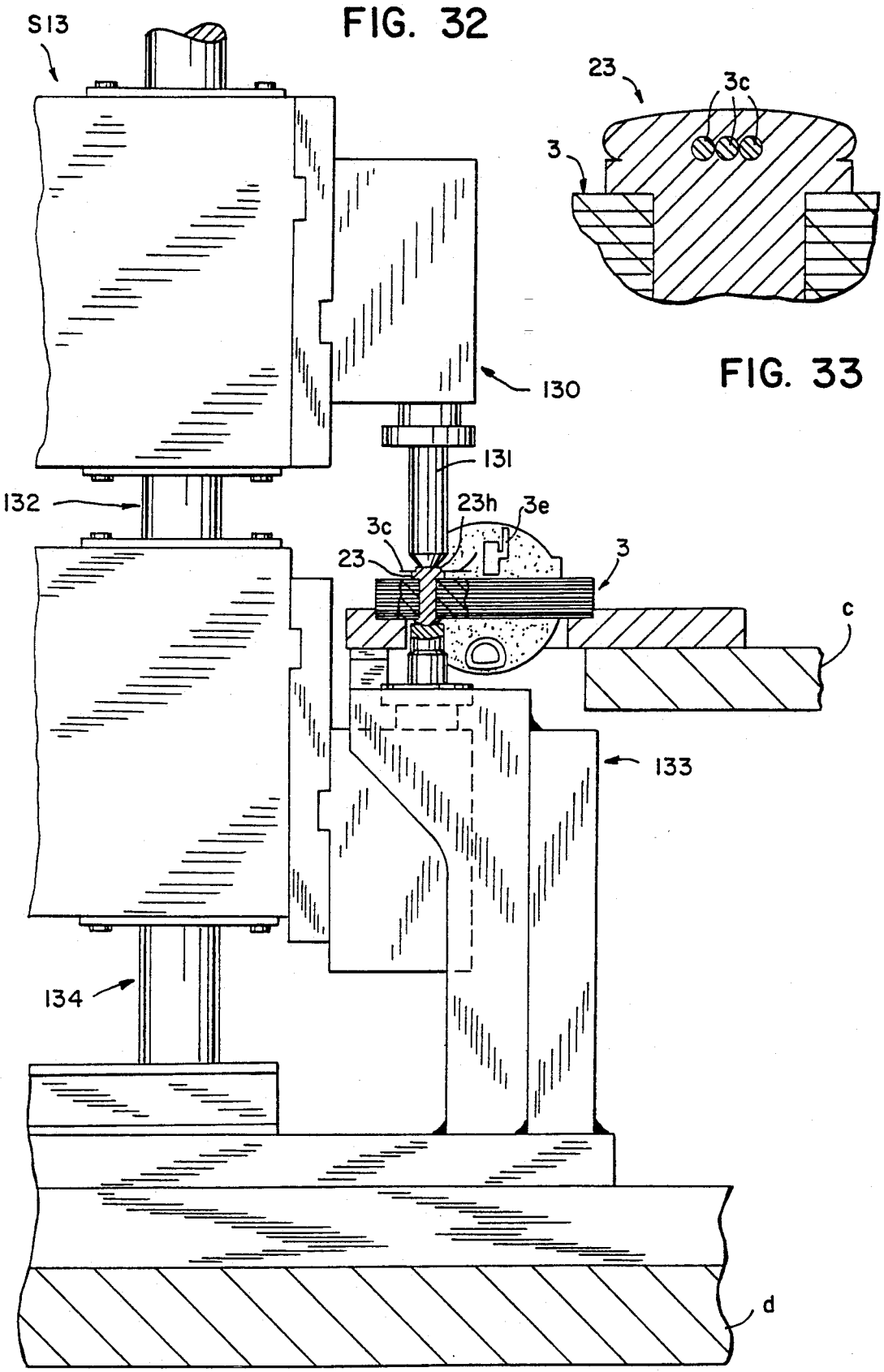
FIG. 32 is a side view of station s13 depicting the spot welding of the deformed rivet head, taken along line 32—32 of FIG. 1.

FIGS. 27 and 28 are side views of station s10, which station is used to firmly press the wires into the bottom of rivet slot 23f. As shown in FIG. 27, arm 100 is moved towards frame 3 by suitable pneumatics 101. Extending from arm 100 is a pair of spaced guides 102 which are moved into alignment with walls 23c'' and 23d'' of slot 23f. At the same time, arm 102 is moved by suitable pneumatics 103 in a vertical, downward direction toward slot 23f. Projecting from arm 102 is a pressing arm 104 which is moved downward to engage wires 3c and then is reciprocated (FIG. 28) to rub wires 3c so that they lie in the bottom of slot 23f and conform to bottom surface 23f' (FIG. 18) of the slot. Thus, arm 104 both presses and rubs the ground wires.

FIG. 29 is a side view of station s10 which more clearly depicts the positions of guides 102 and arm 104 during the rubbing and pressing of wires 3c.

After the wires are properly positioned in slot 23f, the head of rivet 23, including members 23c and 23d (FIG. 8), are deformed to capture a portion of wires 3c within the rivet head. The deformation of the rivet head is accomplished at station s11, and is intended to entirely enclose slot 23f.

The deformation of the rivet head is preferably achieved using an orbital riveting device such as one manufactured by Taumel Assembly Systems, Patterson, N.Y. A more conventional spin riveter may also be used wherein the peen of the riveter is spun on a substantially vertical axis.

In the orbital riveter 110 depicted in FIG. 30, a rotating riveting head 111 has an eccentrically disposed peen 112 which engages the rivet head of rivet 23. The eccentric or orbital motion of peen 112, which it is spinning with a pressure applied to it, causes the rivet head to be deformed into a substantially flat surface 23h (FIG. 31).

As shown in FIG. 30, an anvil 113 abuts the bottom end of rivet 23 during the orbital riveting to prevent rivet 23 from being pressed into rivet aperture 3f of frame 3.

The shape of the rivet-wire terminal assembly after the orbital riveting step is shown in the exploded view of FIG. 31. As shown in FIG. 31, a portion of each of wires 3c has been captured within the rivet head. The rivet head now has a substantially flat surface 23h. Although surface 23h may be slightly rounded or convex, it is still substantially flat. FIG. 31 demonstrates that a secure, mechanical connection has now been formed between ground wires 3c and rivet 23.

To form a secure electrical connection between wires 3c and rivet 23, a resistive or spot welder 130 is used at station s13. Welder 130 has a hot electrode 131 that is moved into position to contact the deformed rivet head via suitable pneumatics 132. Electrode 131 contacts surface 23h of the rivet head without contacting the ground wires themselves. If the wires themselves were contacted as in some prior art methods, the wires may become hardened or brittle, potentially reducing the life of the terminal connection assembly.

A sufficient current is passed through electrode 131 to vaporize any insulation that might be present on those portions of wires 3c which have been captured within the deformed rivet head. The insulation on the wire portions on either side of the captured wire portion remains on the insulated wire. The vaporizing of the insulation in this manner avoids the step of manually removing the insulation to form a secure electrical connection. During the welding process, an anvil assembly 133 is moved into place by suitable pneumatics 134 to abut the bottom end of rivet 23. An infrared thermometer (not shown) monitors the temperature of the rivet head. If the rivet head temperature is not high enough during the welding process, an alarm signal is issued so that corrective action may be taken.

Figure 33:
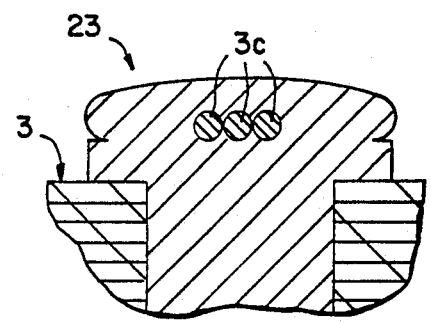
FIG. 33 is an exploded view of the deformed rivet head with the captured wires after the spot welding step.

FIG. 33 is an exploded cross-sectional side view of the rivet head which clearly depicts wires 3c being totally captured within the deformed rivet head, thereby making a secure electrical connection between the rivet and ground wires 3c.

The steps depicted in FIGS. 34 through 42 relate to the soldering of primary coil wire 3d to its respective terminal 3e (FIG. 3). These steps are not part of the method of connecting ground wires 3c to rivet 23, but are incorporated into the preferred embodiment since it is most efficient to perform these steps using indexing machine 1.

Since primary coil wire 3d is to be soldered onto its respective terminal, coil frame 3 must be repositioned so that terminal 3e may be dipped into the soldering flux and then into the solder. The purpose of station s15, as depicted in FIGS. 34 and 36, is to place coil frame 3 in that proper position.

Referring to FIG. 34, station s15 includes an arm 150 that supports a rotating cylinder 151. The drive shaft of rotating cylinder 151 is connected to a rotatable arm 152 having a pair of grab jaws 153 interconnected therewith. Station s15 also includes a rotating cylinder 154 whose shaft 155 is connected to an arm 156 having a second pair of grab jaws 157. Grab jaws 157 grab coil frame 3 and rotate it 180° about a horizontal axis to the position depicted in FIG. 36. After grab jaws 157 are released, grab jaws 153 rotate frame 3 90° in the clockwise direction about a vertical axis to properly position frame 3 in fixture 10.

FIG. 35 depicts the rotational movements of frame 3 by station s15. As shown in FIG. 35, frame 3 is first rotated 180° about a horizontal axis, and is then rotated 90° in the counterclockwise direction about a vertical axis to place it in the proper position.

Figure 37:
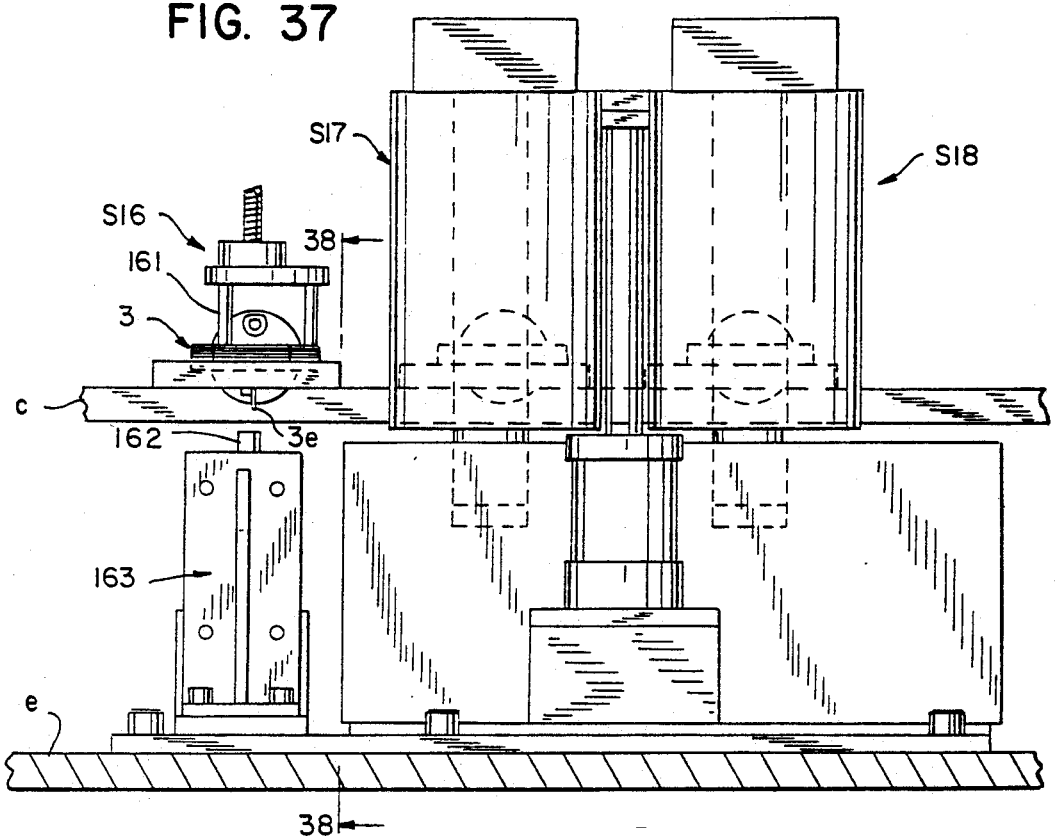
FIG. 37 is an end view of stations s16, s17 and s18.
Figure 39:
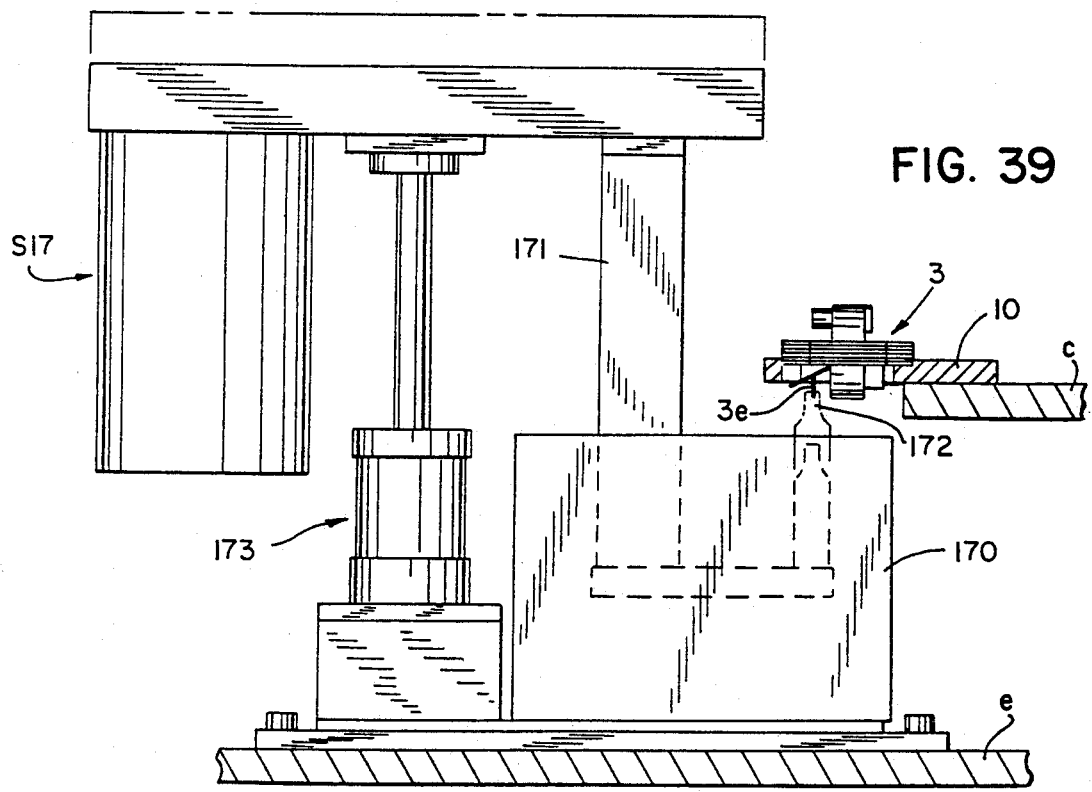
FIG. 39 is a side view of station s17 depicting the soldering of the ignition ground wire.

FIGS. 37 through 39 depict stations s16, s17, and s18 which are used to solder ground wire 3d onto terminal 3e. As best shown in FIGS. 37 and 38, station s16 performs two functions: it inspects for the position of frame 3, and it also applies the soldering flux material to terminal 3e.

To determine that frame 3 is in the proper position, a plurality of spaced proximity sensors 161 are moved in a downward direction into engagement with the laminations of frame 3. At the same time, a flux reservoir 162 is moved in a upward, vertical direction by an arm 163 and suitable pneumatics 164 (FIG. 38). Arm 163 is interconnected with platform e. Flux 165 engages terminal 3e and is deposited thereon. Dial 1a is then indexed to the next position to place frame 3 under station s17.

Terminal 3e is first soldered using station s17, depicted in FIGS. 37 and 39. A molten soldering material from bath 170 is drawn up via a partial vacuum pressure into tube 171 and is then bubbled through open end 172, whereupon it is deposited on primary coil wire 3d and terminal 3e to make an electrical connection therebetween. Soldering tube 171 is raised and lowered via a drive mechanism 173 as depicted in FIG. 39.

To insure a proper connection, terminal 3e is then soldered again at station s18 using an apparatus and process that is substantially identical to that described above in connection with station s17. FIG. 40 is a perspective view of coil frame 3 after wire 3d has been soldered onto terminal 3e.

To prevent interference from the ignition wire which must be connected to the coil frame, soldered terminal 3e is bent at a 45° angle at station s20, as depicted in FIG. 41. In FIG. 41, an arm 200 is moved into engagement with terminal 3e via suitable pneumatics 201. Arm 200 is moved a sufficient amount to bend terminal 3e about 45°, as depicted in FIG. 41. The resulting coil frame with a bent terminal 3e is depicted in FIG. 42.

Station s21, depicted in FIGS. 43 through 48, depicts the final testing of the completed coil assembly to determine whether it is fully operational. Station s21 tests the ground terminal connections as well as the ignition circuit and the coils used therein. Any faulty coil assembly is rejected.

Figure 43:
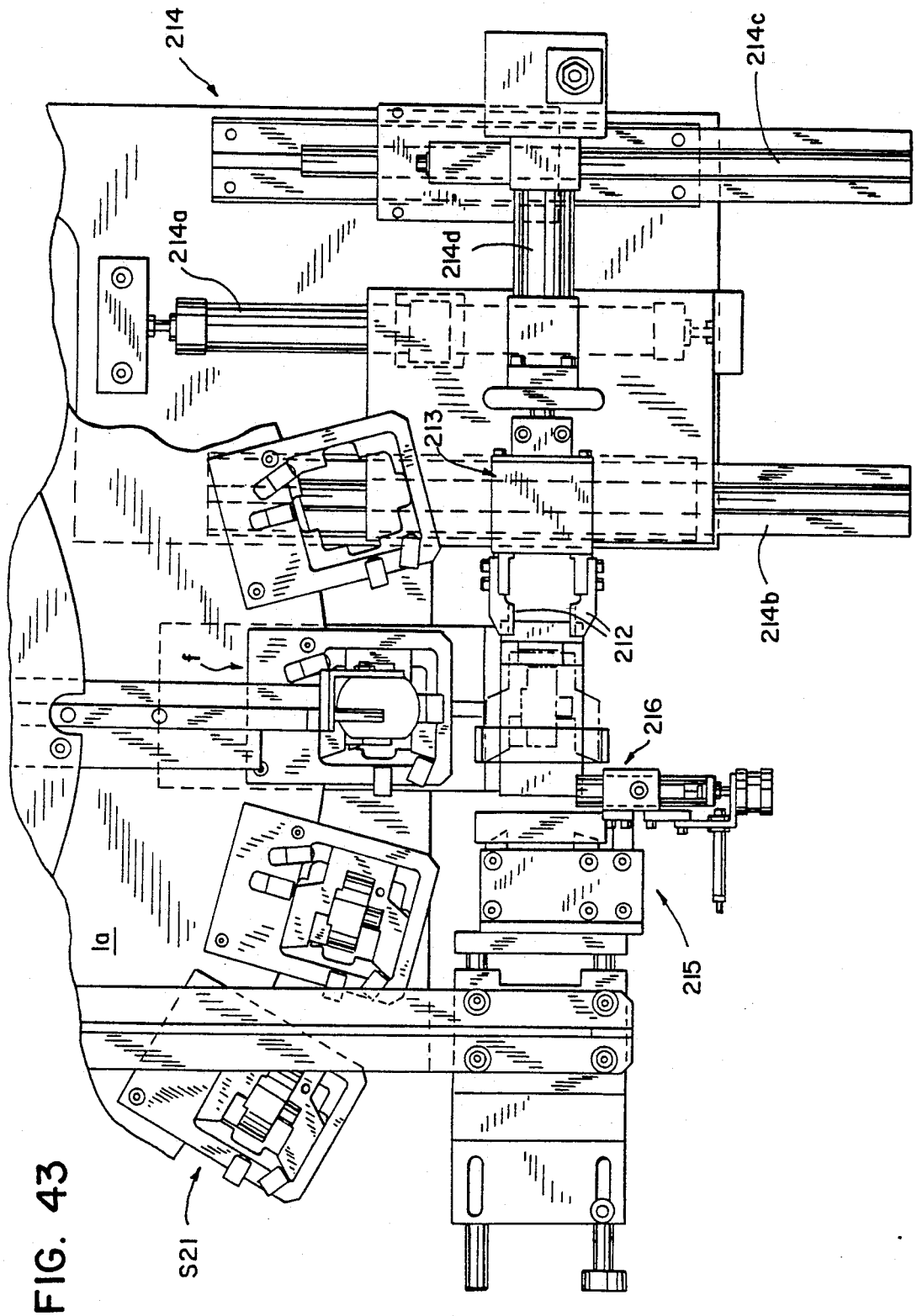
FIG. 43 is a top view of station s21 depicting the apparatus for testing the circuit of the completed frame.
Figure 44:
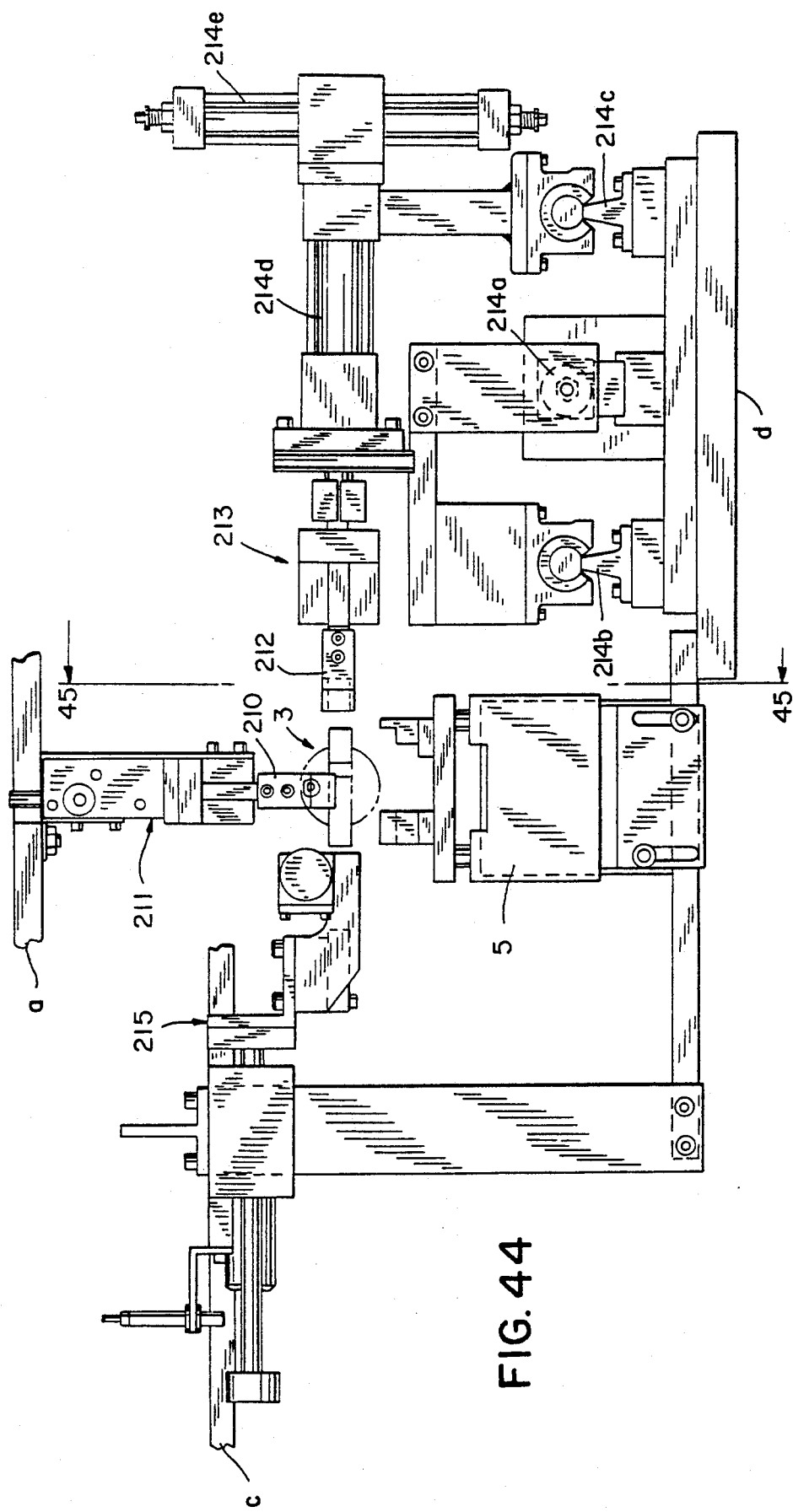
FIG. 44 is an end view of station s21, taken along line 44—44 of FIG. 1.
Figure 45:
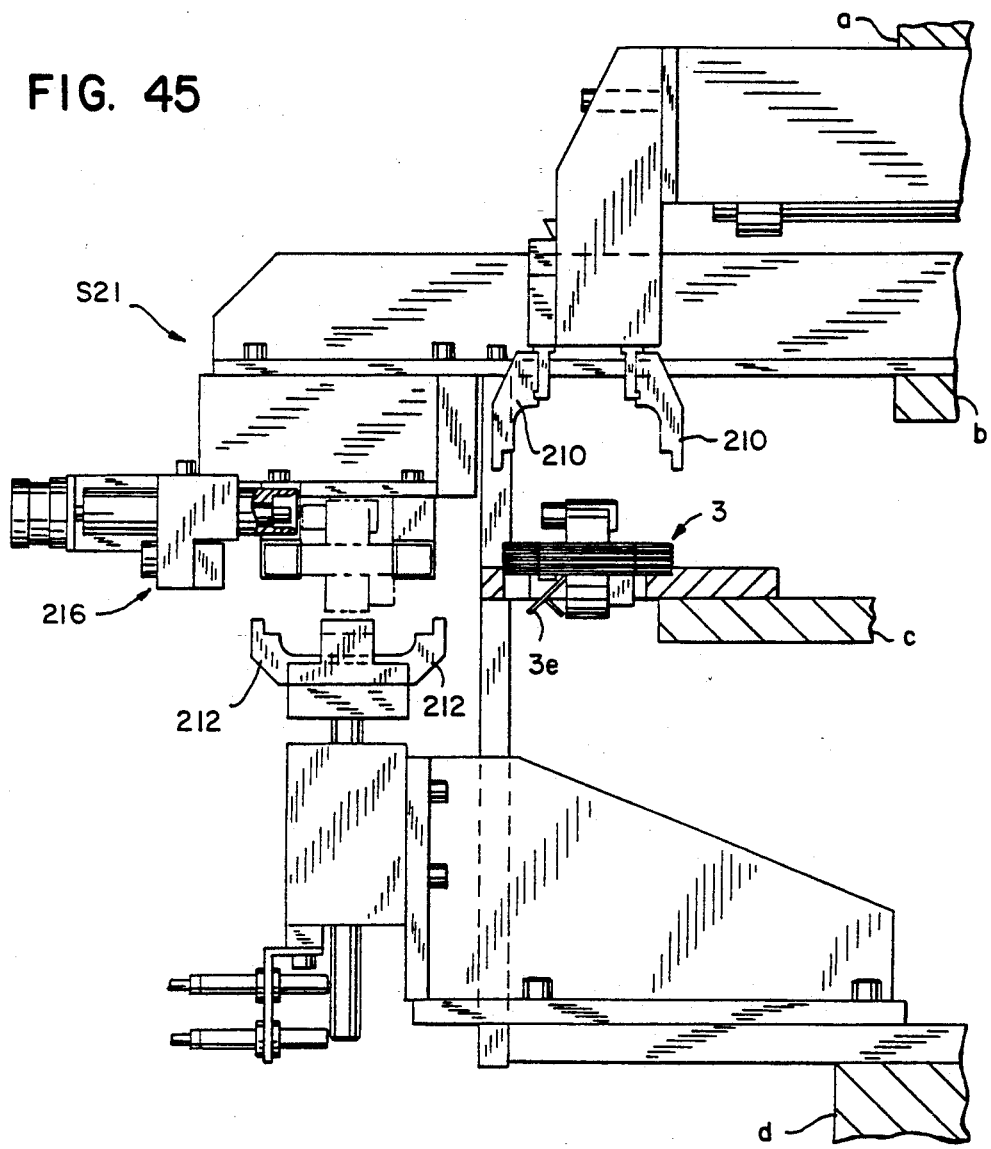
FIG. 45 is a side view of the station s21, tester, taken along line 45—45 of FIG. 44.

As shown in FIG. 43, dial 1a is indexed until frame 3 is positioned in position f. When frame 3 is in the proper position, it is picked up by a pair of grab jaws 210 connected to movable arm 211. Jaws 210 and arm 211 position coil frame 3 to the phantom position shown in FIG. 43. Thereafter, a second pair of grab jaws 212 are moved in a horizontal direction by arm 213 and suitable pneumatics 214. Pneumatics 214 include a pneumatic cylinder 214a which moves arm 213 along guide rails 214b and 214c. Arm 213 is moved either towards or away from coil frame 3 by a pneumatic cylinder 214d. Arm 213 is moved in the vertical direction by a pneumatic cylinder 214e (FIG. 44).

While coil frame 3 is held firmly in position by grab jaws 212, a coil tester 215 is moved into position. Coil tester 215 includes a means for generating a magnetic field within the laminations of frame 3, and a voltage sensing means 216 for sensing the voltage created across the ignition primary winding in response to the generated magnetic field. The generated magnetic field is intended to simulate, at a reduced value, the varying magnetic field generated under actual engine operations. The magnitude of the resulting voltage across the primary winding is then used by the processor to determine whether the ignition circuit is functioning properly.

Figure 46:
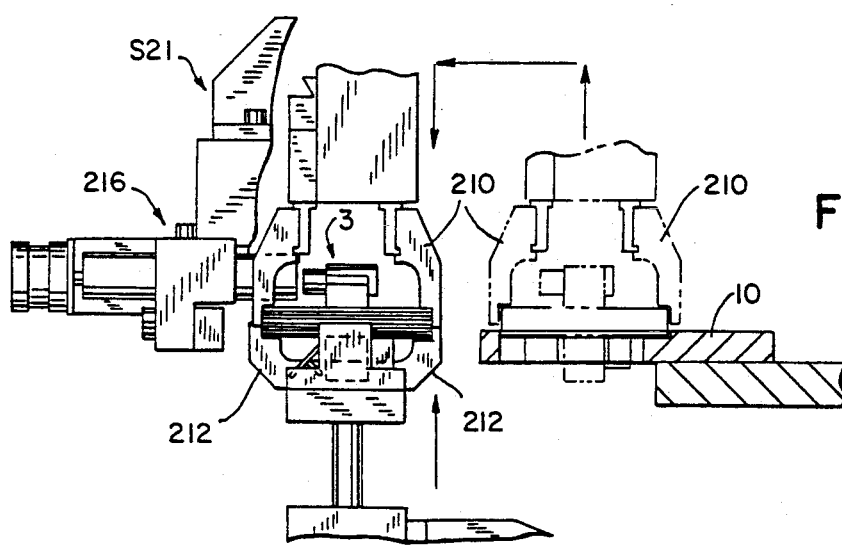
FIG. 46 is an exploded view of station s21 depicting the picking up of a frame by the grab jaws.
Figure 47:
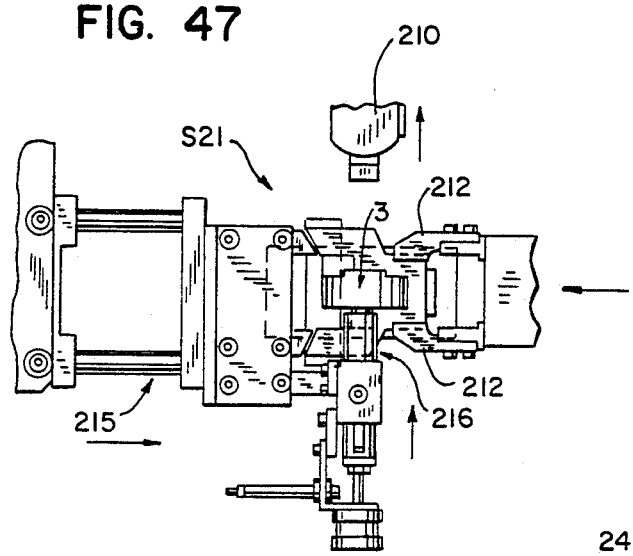
FIG. 47 is an exploded top view of station S21 depicting the testing of a completed frame.
Figure 48:
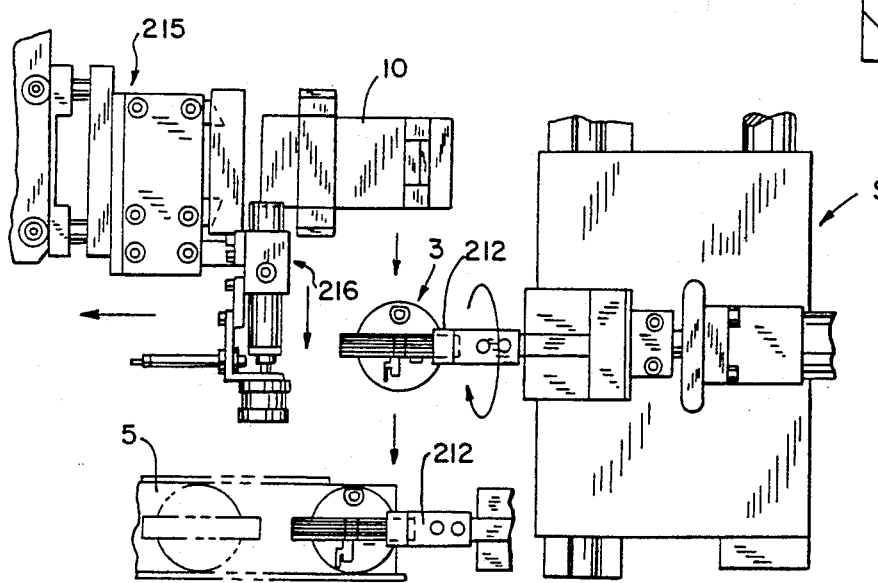
FIG. 48 is an exploded top view of station s21 depicting the movement of the machine components if the test is successful.

FIGS. 46 through 48 depict the testing sequence As shown in FIG. 46, grab jaws 210 pick up coil frame 3 and place it in position to be retained by grab jaws 212 and to be tested by tester 216. As shown in FIG. 47, grab jaws 210 are removed and tester 216 engages coil frame 3 to perform the test. After the test has been completed and assuming frame 3 has passed the test, jaws 212 rotate frame 3 in a counterclockwise direction and deposit the frame onto conveyor 5. At the same time, tester 216 is moved away from frame 3 and jaws 212. If frame 3 had not passed the test, jaws 212 would have released frame 3 to let it drop into a reject bin instead of placing frame 3 on conveyor 5.

Figure 49:
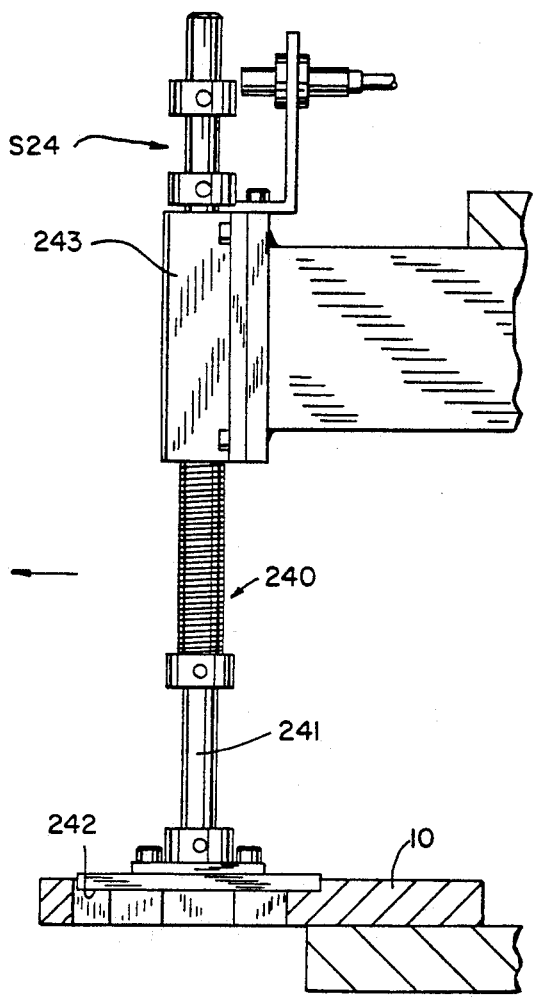
FIG. 49 is a side view of station s24, taken along line 49—49 of FIG. 1.

FIG. 49 is a side view of the last operational station s24. Station s24 performs a safety inspection to verify that frame 3 has been removed from fixture 10 before dial 1a is indexed back to station s1. As shown in FIG. 49, the safety test is performed by having a proximity sensor 240 with a plunger 241 engage fixture 10 via a substantially flat surface 242 of plunger 241. Proximity sensor 240 is interconnected with an arm 243. If a coil frame is sensed by proximity sensor 240, the indexing machine stops running to prevent damage to the indexing machine.

Although a preferred embodiment of the present invention has been shown and described, alternate embodiments will be apparent to those skilled in the art and are within the intended scope of the present invention. Therefore, the invention is to be limited only by the following claims.

We claim:

1. An electrical terminal connector, comprising:
   an elongated shank portion having an upper end and having a longitudinal axis;
   a had integral with said upper end, including:
      a base portion having a width that is greater than the width of said shank portion, said base portion being substantially normal to said shank longitudinal axis; and
      a pair of spaced, opposed, semi-frustoconical sections protruding from said base portion in a direction away from said shank portion, said spaced sections defining a slot therebetween.

2. The connector of claim 1, wherein said shank portion is substantially cylindrical.

3. The connector of claim 1, wherein said base portion is substantially cyclindrical.

4. The connector of claim 1, wherein said head is made from a deformable, metal material.

5. The connector of claim 1, wherein said head is made from a material containing copper.

6. The connector of claim 1, wherein said slot has a non-planar bottom surface in the longitudinal direction.

7. The connector of claim 6, wherein said bottom surface is curved in the longitudinal direction.

8. A solderless electrical terminal assembly, comprising:
   a terminal connector, including
      an elongated shank portion having an upper end and having a longitudinal axis;
      a head integral with said upper end, including:
         a base portion having a width that is greater than the width of said shank portion and being substantially normal to said shank longitudinal axis; and
         a pair of spaced, opposed, semi-frustoconical sections protruding from said base portion in a direction away from said shank portion, said spaced sections defining a slot therebetween before any deformation of said head, and said head having a substantially flat upper surface after said semi-frustoconical sections have been deformed;
   at least one wire, including
      an uninsulated wire section disposed within said slot before said deformation and beneath said upper surface after said deformation;
      an insulated wire section disposed on a first side of said head; and
      a second insulated wire section disposed on an opposite, second side of said head.

9. The electrical terminal assembly of claim 8, wherein said shank portion is substantially cylindrical.

10. The electrical terminal assembly of claim 8, wherein said base portion is substantially cylindrical.

11. The electrical terminal assembly of claim 8, wherein said base portion is made from a material containing copper.

12. The electrical terminal assembly of claim 8, wherein said wire is a coil wire of an internal combustion engine.

* * * * *

UNITED STATES PATENT AND TRADEMARK OFFICE
CERTIFICATE OF CORRECTION

PATENT NO. : 5,269,713
DATED : December 14, 1993
INVENTOR(S) : Joseph Brezovar et al It is certified that error appears in the above-identified patent and that said Letters Patent is hereby corrected as shown below:

CLAIM 1, Col. 11, Line 11, delete "had" and substitute therefor ---head---.

CLAIM 3, Col. 11, Line 23, delete "cyclindrical" and substitute therefor ----cylindrical----.

Signed and Sealed this

Tenth Day of May, 1994

*Attest:*

BRUCE LEHMAN

*Attesting Officer*     *Commissioner of Patents and Trademarks*